(12) United States Patent
Nakamura

(10) Patent No.: US 11,799,925 B2
(45) Date of Patent: Oct. 24, 2023

(54) COMMUNICATION SYSTEM, COMMUNICATION TERMINAL, AND SCREEN SHARING METHOD

(71) Applicant: Daiki Nakamura, Kanagawa (JP)

(72) Inventor: Daiki Nakamura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 127 days.

(21) Appl. No.: 17/469,892

(22) Filed: Sep. 9, 2021

(65) Prior Publication Data

US 2022/0086204 A1   Mar. 17, 2022

(30) Foreign Application Priority Data

Sep. 16, 2020   (JP) ................. 2020-155740

(51) Int. Cl.
*H04L 65/401* (2022.01)
*G06F 3/04842* (2022.01)

(52) U.S. Cl.
CPC ...... *H04L 65/4015* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 11,243,786 B2* | 2/2022 | Zimmermann | H04L 65/612 |
| 2017/0097745 A1* | 4/2017 | Nimri | G06F 8/38 |
| 2017/0177190 A1 | 6/2017 | Inoue et al. | |
| 2017/0300286 A1* | 10/2017 | Lieb | G06F 3/1454 |
| 2018/0095711 A1 | 4/2018 | Kanda et al. | |
| 2020/0177742 A1 | 6/2020 | Homma et al. | |
| 2021/0133055 A1 | 5/2021 | Nakamura et al. | |
| 2021/0183336 A1* | 6/2021 | Hassan | G09G 5/14 |

FOREIGN PATENT DOCUMENTS

| | | |
|---|---|---|
| JP | 2009-125271 | 6/2009 |
| JP | 2010-092184 | 4/2010 |
| JP | 2012-129626 | 7/2012 |
| JP | 2013-054476 | 3/2013 |
| JP | 2013-140595 | 7/2013 |
| JP | 2014-230034 | 12/2014 |
| JP | 2015-060592 | 3/2015 |
| JP | 2015-138446 | 7/2015 |
| JP | 2017-112581 | 6/2017 |
| JP | 2018-080513 | 4/2018 |

* cited by examiner

*Primary Examiner* — Angela Nguyen
(74) *Attorney, Agent, or Firm* — XSENSUS LLP

(57) ABSTRACT

A communication system includes a first communication terminal including first circuitry and a second communication terminal including second circuitry. The first circuitry of the first communication terminal receives selection of multiple screens to be displayed on a first display of the first communication terminal. The second circuitry of the second communication terminal controls a second display of the second communication terminal to display the multiple screens for which the selection is received by the first circuitry, by using information on the multiple screens and layout information corresponding to a number of screens of the multiple screens.

8 Claims, 23 Drawing Sheets

| TERMINAL ID | PASSWORD |
|---|---|
| 01aa | aaaa |
| 01ab | abab |
| 01ba | baba |
| ... | ... |

FIG. 7

| TERMINAL ID | DESTINATION NAME | OPERATION STATE | RECEPTION DATE AND TIME | TERMINAL IP ADDRESS |
|---|---|---|---|---|
| 01aa | TERMINAL AA, TOKYO BRANCH, JAPAN | ONLINE (READY) | 20xx.4.10.13:40 | 1.2.1.3 |
| 01ab | MR. AB, TOKYO BRANCH, JAPAN | ONLINE (BUSY) | 20xx.4.09.12:00 | 1.2.1.4 |
| 01ac | MS. AC, TOKYO BRANCH, JAPAN | OFFLINE | 20xx.4.09.12:30 | 1.2.1.5 |
| ... | ... | ... | ... | ... |
| 01ba | TERMINAL BA, BEIJING BRANCH, CHINA | ONLINE (READY) | 20xx.4.10.13:45 | 1.2.2.3 |
| 01bb | MR. BB, BEIJING BRANCH, CHINA | ONLINE (COMMUNICATION TEMPORARILY INTERRUPTED) | 20xx.4.10.13:50 | 1.2.2.4 |
| ... | ... | ... | ... | ... |
| 01ca | TERMINAL CA, WASHINGTON D.C. BRANCH, US | OFFLINE | 20xx.4.10.12:45 | 1.3.1.3 |
| 01cb | MS. CB, WASHINGTON D.C. BRANCH, US | ONLINE (BUSY) | 20xx.4.10.13:55 | 1.3.1.4 |
| ... | ... | ... | ... | ... |
| 01da | TERMINAL DA, BERLIN BRANCH, EUROPE | ONLINE (BUSY) | 20xx.4.08.12:45 | 1.3.2.3 |
| 01db | MR. DB, BERLIN BRANCH, EUROPE | ONLINE (READY) | 20xx.4.10.12:45 | 1.3.2.4 |
| ... | ... | ... | ... | ... |

| TERMINAL ID OF SOURCE TERMINAL | TERMINAL ID OF DESTINATION TERMINAL |
|---|---|
| 01aa | 01ab, ..., 01ba, 01bb, ..., 01ca, 01cb, 01da, 01db, ... |
| 01ab | 01aa, 01ca, 01cb, 01da |
| ... | ... |
| 01ba | 01aa, 01ab, 01ca, 01cb, 01da, 01db |
| ... | ... |
| 01da | 01aa, 01ab, 01ba, ..., 01ca, 01cb, ..., 01db |

| SESSION ID | APPARATUS ID OF RELAY APPARATUS | TERMINAL ID OF SOURCE TERMINAL | TERMINAL ID OF DESTINATION TERMINAL | DELAY TIME | RECEPTION DATE AND TIME OF DELAY INFORMATION |
|---|---|---|---|---|---|
| se01 | 111a | 01aa | 01db | 200 | 20xx.4.10.13:41 |
| se2 | 111a | 01ba | 01cb | 50 | 20xx.4.10.12:01 |
| ... | ... | ... | ... | ... | ... |

FIG. 11

SESSION ID: se02

SESSION ID: se01

| ID | SEQUENCE NUMBER | body | parent |
|---|---|---|---|
| se01 | 1 | children : pag01, pag02, pag03, pag04<br>current page : pag04 | - |
| pag01 | 2 | URL of image data: http://xxx.jpeg | se01 |
| mnojk | 3 | Color (RGBA) : (0,0,0,0)<br>Width (px) : 10px<br>Vertices (x, y) : (0,0), (10,0), (20,1), (30,10) | pag01 |
| bmqpv | 4 | Color (RGBA) : (128,0,0,0)<br>Width (px) : 14px<br>Vertices (x, y) : (10,50), (15,55), (16,40) | pag01 |
| ... | ... | ... | ... |
| pag02 | 12 | - | se01 |
| rstuv | 13 | Color (RGBA) : (255,255,255,0)<br>Width (px) : 10px<br>Vertices (x, y) : (110,20), (110,30), (11,40) | pag02 |
| ... | ... | ... | ... |
| pag04 | 50 | URL of image data: http://yyy.jpeg | se01 |
| aaaaa | 51 | Color (RGBA) : (255,255,128,0)<br>Width (px) : 13px<br>Vertices (x, y) : (57,60), (123,43) | pag04 |
| ... | ... | ... | ... |

FIG. 18A

| Page 1 | Page 2 | |

FIG. 18B

| Page 1 | Page 2 |
| | Page 3 |

FIG. 18C

| Page 1 | Page 2 |
| Page 3 | Page 4 |

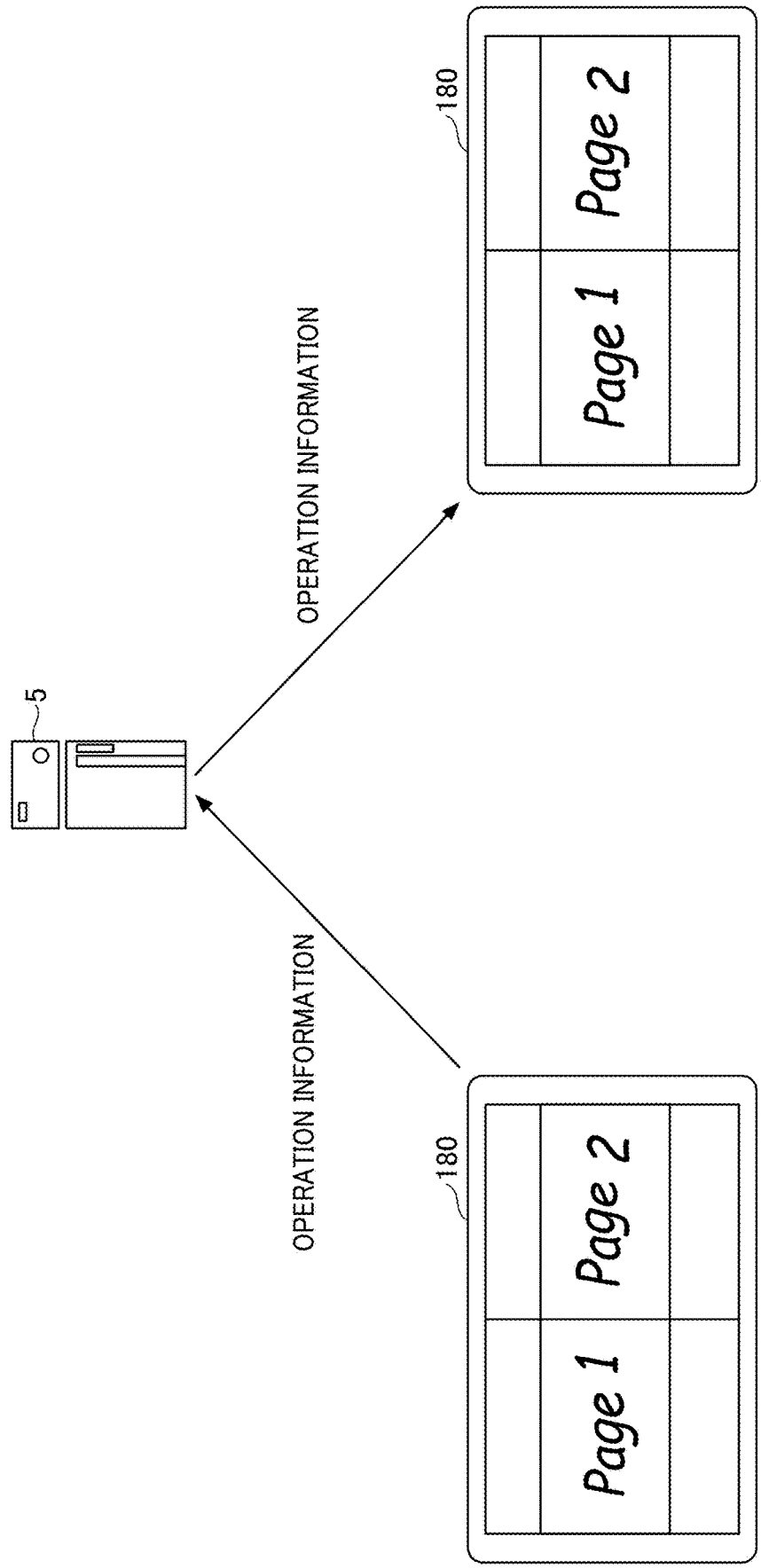

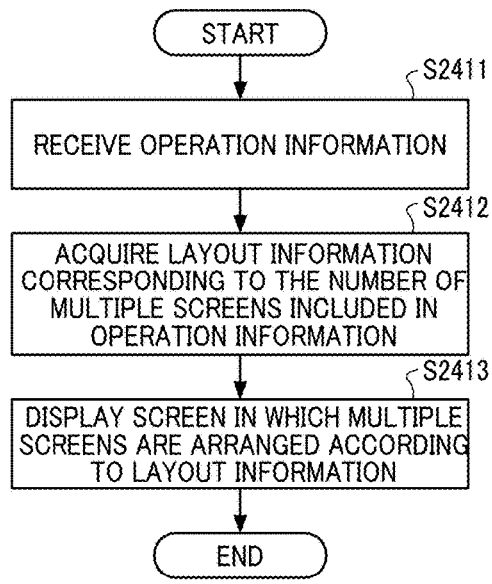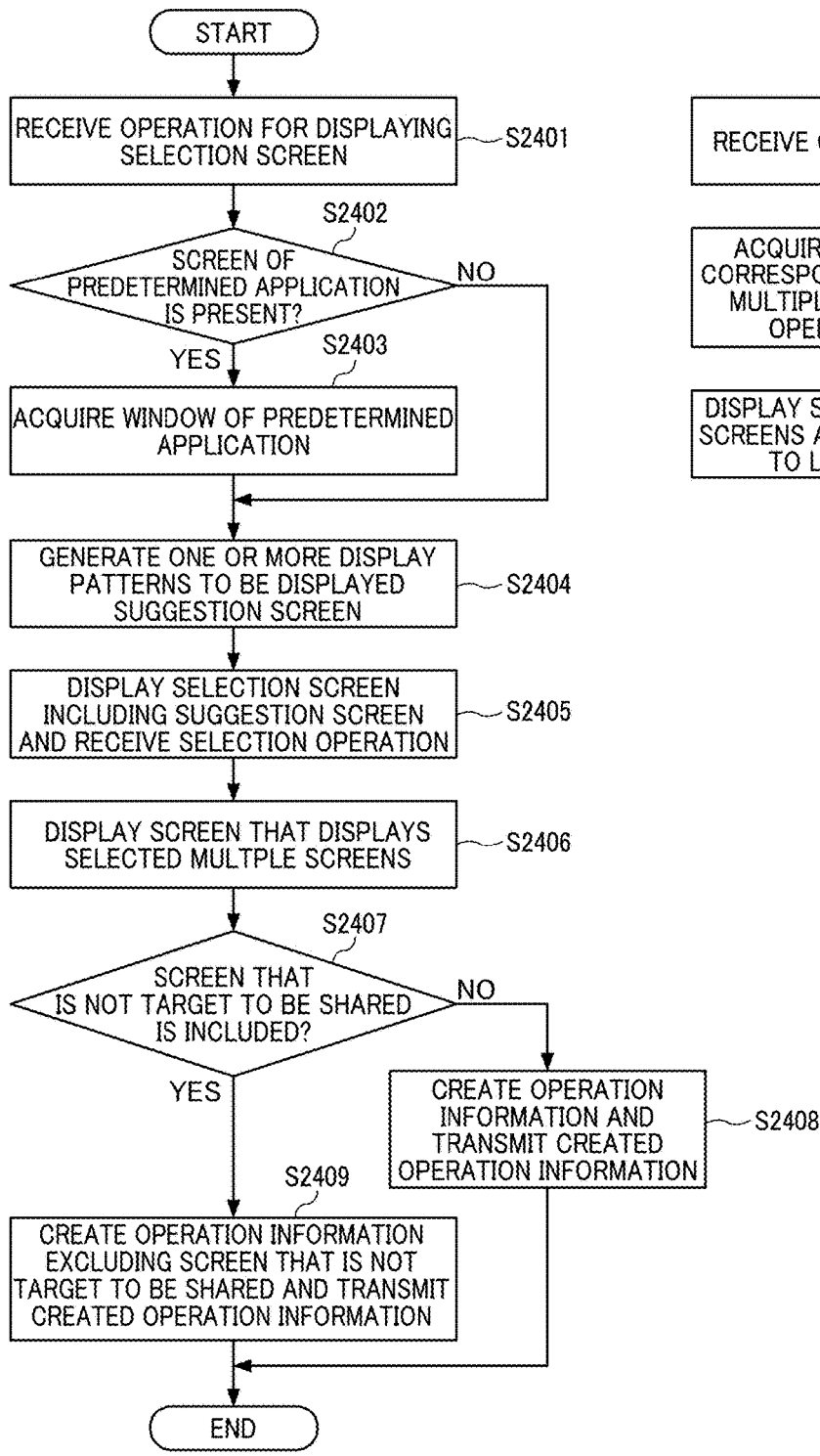

COMMUNICATION SYSTEM, COMMUNICATION TERMINAL, AND SCREEN SHARING METHOD

CROSS-REFERENCE TO RELATED APPLICATIONS

This patent application is based on and claims priority pursuant to 35 U.S.C. § 119(a) to Japanese Patent Application No. 2020-155740, filed on Sep. 16, 2020, in the Japan Patent Office, the entire disclosure of which is hereby incorporated by reference herein.

BACKGROUND

Technical Field

Embodiments of the present disclosure relate to a communication system, a communication terminal, and a screen sharing method.

Related Art

Remote conference systems, such as videoconferencing systems, are now in widespread use, enabling multiple communication terminals to conduct a conference (meeting) through a communication network such as the Internet. In such remote conference systems, a display screen is shared among the multiple communication terminals, and stroke data for reproducing a stroke image drawn by a user with an electronic pen, the user's hand or the like is transmitted and received among the communication terminals to share the stroke image.

Further, a conference system is known that includes the configuration as described above and further calculates attention paid to conference data based on a state of the conference data displayed on each of communication terminals participating in a conference to create a screen to be displayed on each of the communication terminals participating in the conference in accordance with an order of the attention.

SUMMARY

An embodiment of the present disclosure includes a communication system including a first communication terminal including first circuitry and a second communication terminal including second circuitry. The first circuitry of the first communication terminal receives selection of multiple screens to be displayed on a first display of the first communication terminal. The second circuitry of the second communication terminal controls a second display of the second communication terminal to display the multiple screens for which the selection is received by the first circuitry, by using information on the multiple screens and layout information corresponding to the number of screens of the multiple screens.

Another embodiment of the present disclosure includes a communication terminal that communicates with another communication terminal. The communication terminal includes circuitry. The circuitry receives selection of multiple screens to be displayed on a display of the communication terminal. The circuitry controls the display of the communication terminal to display multiple screens for which selection is received by the another communication terminal, by using information on the multiple screens for which selection is received by the another communication terminal and layout information corresponding to the number of screens of the multiple screens for which selection is received by the another communication terminal.

Another embodiment of the present disclosure includes a screen sharing method performed by a communication terminal that communicates with another communication terminal. The method includes receiving selection of multiple screens to be displayed on a display of the communication terminal. The method further includes controlling the display of the communication terminal to display multiple screens for which selection is received by the another communication terminal, by using information on the multiple screens for which selection is received by the another communication terminal and layout information corresponding to the number of screens of the multiple screens for which selection is received by the another communication terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating an example of an authentication management table, according to an embodiment of the present disclosure;

FIG. 7 is a diagram illustrating an example of a terminal management table, according to an embodiment of the present disclosure;

FIG. 8 is a diagram illustrating an example of a destination list management table, according to an embodiment of the present disclosure;

FIG. 9 is a diagram illustrating an example of a session management table, according to an embodiment of the present disclosure;

FIG. 11 is a diagram illustrating an example of a shared data management table, according to an embodiment of the present disclosure;

FIG. 18A to FIG. 18C are conceptual diagrams each illustrating an example of layout information, according to the first embodiment of the present disclosure;

FIG. 19 is a diagram illustrating an example of a display screen displayed by the electronic whiteboard, according to the first embodiment of the present disclosure;

FIG. 24A and FIG. 24B are flowcharts each illustrating an example of an operation performed by the electronic whiteboard, according the third embodiment of the present disclosure.

Figure 1:
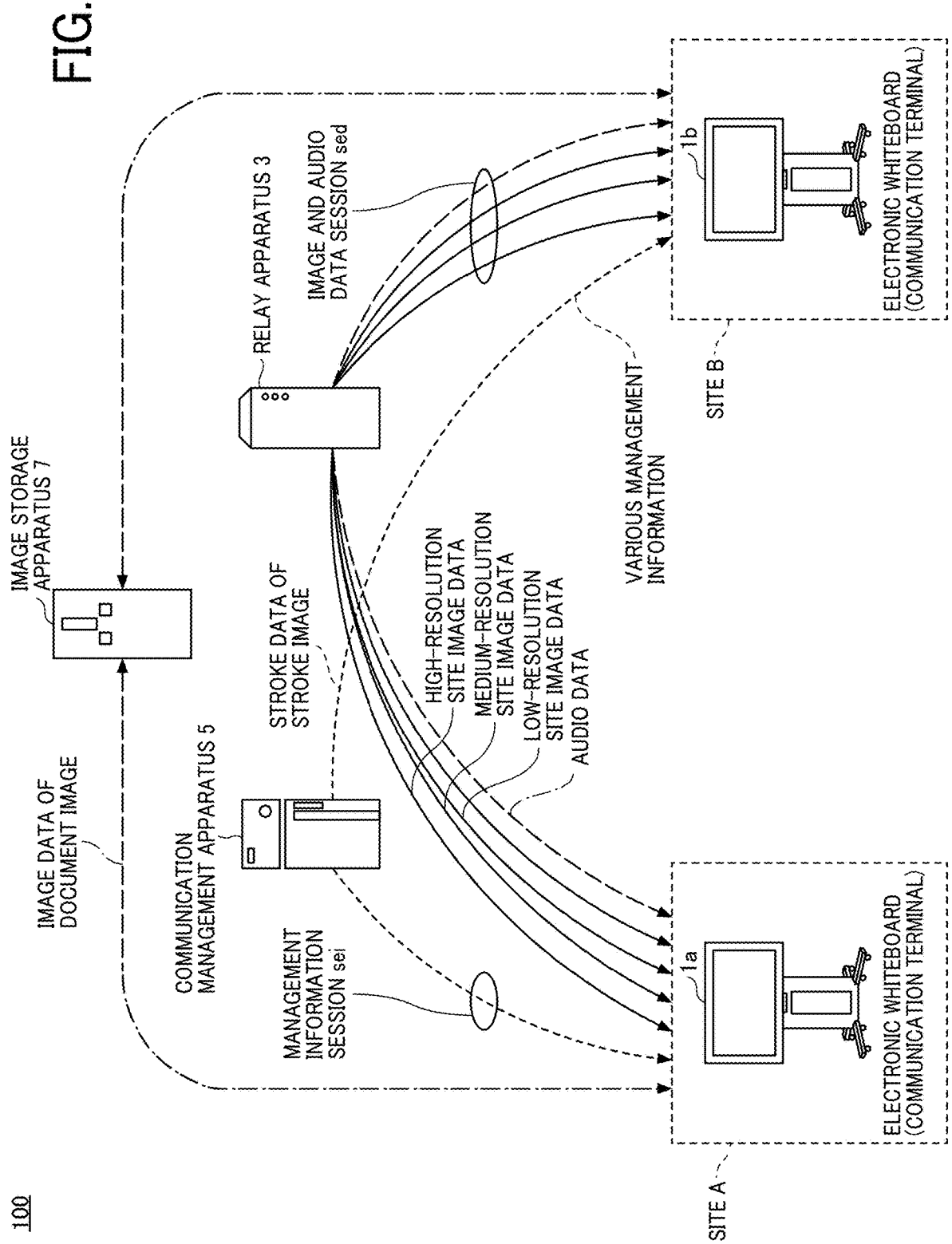
FIG. 1 is a schematic diagram illustrating an example of communication routes in a communication system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present invention are described.

Overview of Communication System:

Referring to FIG. 1, an overview of a communication system 100 for conducting a video conference between a plurality of electronic whiteboards including an electronic whiteboard 1a and an electronic whiteboard 1b while allowing a user to draw images on the electronic whiteboards is described according to an embodiment. FIG. 1 is a schematic diagram illustrating an example of a communication route in the communication system 100 according to the embodiment. The "videoconference" is sometimes called a "teleconference" or a "remote conference".

The "videoconference", the "teleconference", or the "remote conference" is an example of a session in a stroke image is shared between a plurality of terminals. For example, the session in which a stroke image is shared may be a session other than a conference, such as a session in which a remote lesson, a remote medical examination, a meeting, or a casual conversation is performed.

The communication system 100 includes a plurality of electronic whiteboard including the electronic whiteboard 1a and the electronic whiteboard 1b, a relay apparatus 3, a communication management apparatus 5, and an image storage apparatus 7.

The electronic whiteboard 1a and the electronic whiteboard 1b are communication terminals that perform mutual communication of site image data and audio data for a videoconference, background image data, and content data such as stroke data of a stroke image. The electronic whiteboard is also called as an interactive white board (IWB).

Although in the example of FIG. 1, the communication system 100 includes the two electronic whiteboards, i.e., the electronic whiteboard 1a and the electronic whiteboard 1b, in another example, the communication system includes three or more electronic whiteboards. In the following description, any arbitrary one of the electronic whiteboards included in the communication system 100 is referred to as an "electronic whiteboard 1", to simplify the description.

The electronic whiteboard 1 is an example of a communication terminal according to the present embodiment. In another example, the communication terminal is any communication terminal having a communication capability, a drawing function, a display function, etc. For example, the communication terminal is an information terminal such as a personal computer (PC), a tablet terminal, or a smartphone in which an application program that supports the communication system 100 is installed.

The stroke data is data required for reproducing a stroke image. The stroke data includes coordinate data, line width data, line color data, and vector data. The electronic whiteboard 1a and the electronic whiteboard 1b exchange site image data as video data for a video conference and audio data with each other, to reproduce video and sound of a communication counterpart, thereby making a remote video call.

Further, the electronic whiteboard 1a and the electronic whiteboard 1b exchange, for example, image data of a document image to be shared, allowing users using the communication system 100 to share the same document image. The document image is an image displayed on a display of the electronic whiteboard 1. Examples of the document image include, but not limited to, an image of a document for a conference, a background image displayed on the display, a capture screen when the display screen is captured.

Furthermore, the electronic whiteboard 1a and the electronic whiteboard 1b exchange stroke data of a stroke image to be shared, allowing participants using the communication system 100 to share the same stroke image. The stroke image is an image represented by, for example, a line drawn by a user with a handwritten stroke with an electronic pen or the like. The stroke image is displayed by stroke data representing points that indicate coordinates on the display.

FIG. 1 illustrates an electronic whiteboard equipped with a videoconferencing function as an example of the electronic whiteboard 1a and the electronic whiteboard 1b. Note that the image of the video data can be either a moving (video) image or a still image.

In the following description, the electronic whiteboard 1 that sends a request for starting a videoconference is referred to as a "source terminal", and the electronic whiteboard 1 as a request destination (relay destination) to which the request is to be transmitted is referred to as a "destination terminal". For example, in FIG. 1, when the electronic whiteboard 1a requests the start of the videoconference to the electronic whiteboard 1b, the electronic whiteboard 1a is the source terminal and the electronic whiteboard 1b is the destination terminal. Note that the electronic whiteboard 1a and the electronic whiteboard 1b may be used not only for communication between different offices or for communication between different rooms in the same office, but also for communication within the same room or for outdoor-indoor communication or outdoor-outdoor communication.

The relay apparatus 3, which is implemented by one or more computers, performs a process of relaying content data for a call between the electronic whiteboard 1a and the electronic whiteboard 1b.

The communication management apparatus 5, which is implemented by one or more computers, manages communication (session) between the electronic whiteboard 1a and the electronic whiteboard 1b, for example. For example, the communication management apparatus 5 collectively controls login authentication from the electronic whiteboard 1a and the electronic whiteboard 1b, management of communication states of the electronic whiteboard 1a and the electronic whiteboard 1b, management of a destination list, and a communication state of the relay apparatus 3. Further, the communication management apparatus 5 relays the stroke data to be shared between the electronic whiteboard 1a and the electronic whiteboard 1b.

The image storage apparatus 7, which is implemented by one or more computers, stores image data of a document image to be shared, which is uploaded from the electronic whiteboard 1a and is downloaded to the electronic whiteboard 1b. Alternatively, the image data of document image to be shared is uploaded from the electronic whiteboard 1b and is downloaded to the electronic whiteboard 1a. In other words, the image storage apparatus 7 stores the image data uploaded from the electronic whiteboard 1b, which is to be downloaded to the electronic whiteboard 1a.

In one example, each of the relay apparatus 3, the communication management apparatus 5, and the image storage apparatus 7 is configured as a single computer. In another example, each of the relay apparatus 3, the communication management apparatus 5, and the image storage apparatus 7 is configured as a plurality of computers to which one or more units (functions, means, or storages) are arbitrarily allocated.

In the communication system 100, a management information session sei for exchanging various types of management information is established between the electronic whiteboard 1a and the electronic whiteboard 1b through the communication management apparatus 5. In the following description, the management information session sei is referred to as a "session sei". Further, four sessions are established between the electronic whiteboard 1a and the electronic whiteboard 1b to exchange four types of data including image data of high resolution, image data of medium resolution, image data of low resolution, and audio data, through the relay apparatus 3. In FIG. 1, these four sessions are collectively illustrated as an image and audio data session sed. In the following description, the image and audio data session is simply referred to as a "session". Note that the session does not necessarily have the four sessions. The number of sessions may be smaller or larger number of sessions than the four. In addition, the session may be established directly between the source terminal and the destination terminal without intervening the relay apparatus 3.

Further, in the communication system 100, stroke data is exchanged between the electronic whiteboard 1a and the electronic whiteboard 1b using the session sei.

The description is now given of the resolution of video data to be processed in the present embodiment. The video data of low resolution has, for example, 160 pixels in the horizontal direction and 120 pixels in the vertical direction. The video data of low resolution is a base image. The video data of medium resolution has, for example, 320 pixels in the horizontal direction and 240 pixels in the vertical direction. The video data of high resolution has, for example, 640 pixels in the horizontal direction and 480 pixels in the vertical direction. In a case where passing through a narrow band path, low-quality video data that only includes the video data of low resolution as the base image, is relayed. In the case of a relatively wide band path, medium-quality image data including the video data of low resolution as the base image and the video data of medium resolution is relayed. In the case of a very wide band path, high-quality video data including the video data of low resolution as the base image, the video data of middle resolution, and the video data of high resolution is relayed. Since the audio data has a smaller data size than the video data, the audio data is relayed even on the narrow band path.

Figure 2:
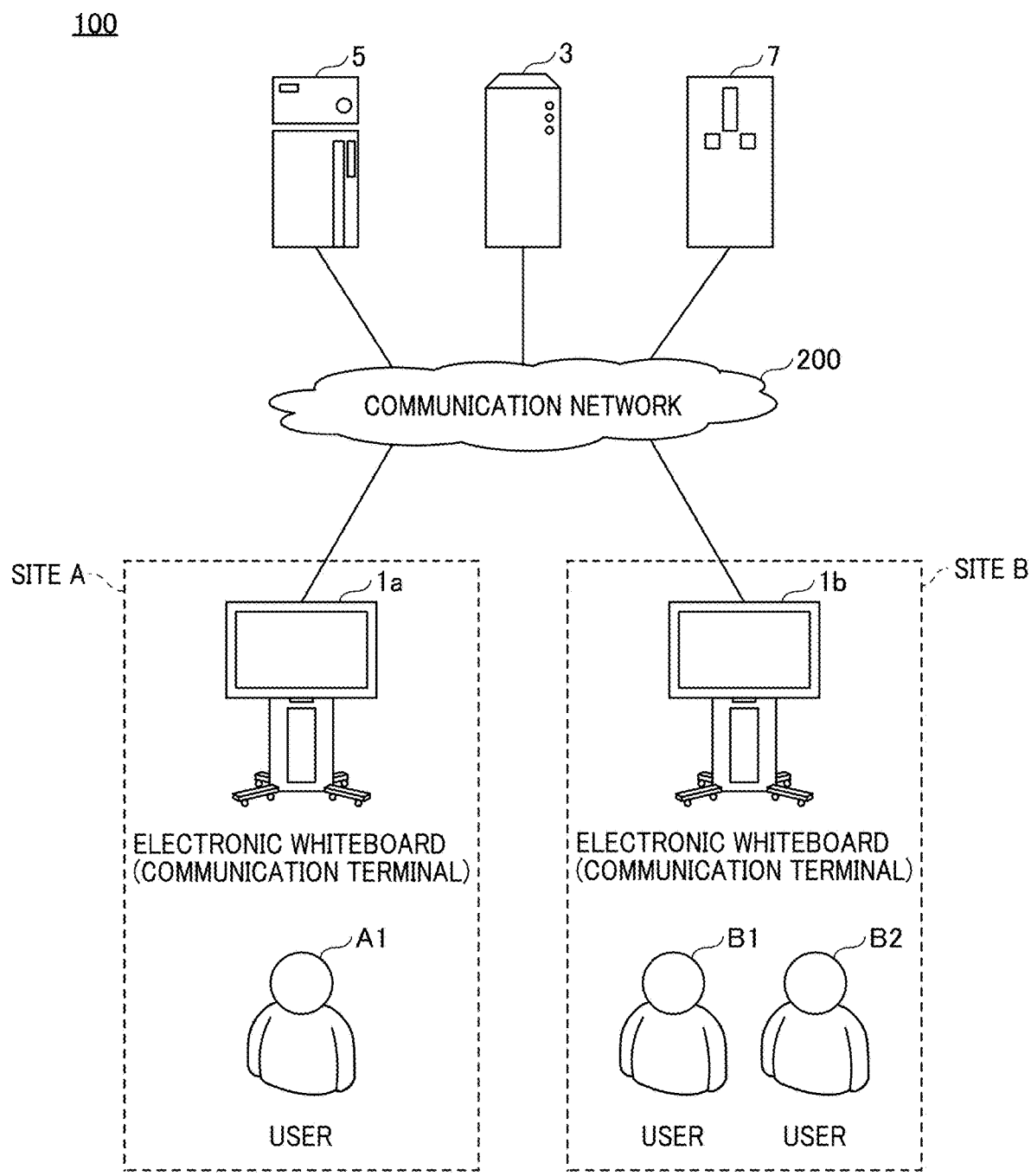
FIG. 2 is a diagram illustrating an example of a system configuration of the communication system, according to an embodiment of the present disclosure.

System Configuration:

FIG. 2 is a diagram illustrating an example of a system configuration of the communication system 100, according to an embodiment.

In FIG. 2, the electronic whiteboard 1a is provided at a site A, and the electronic whiteboard 1b is provided at a site B. For example, the site A is Tokyo office in Japan, and the site B is Osaka office in Japan. Further, User A1 uses the electronic whiteboard 1a at the site A, and User B1 and User B2 use the electronic whiteboard 1b at the site B. The electronic whiteboard 1a is an example of a first communication terminal, and the electronic whiteboard 1b is an example of a second communication terminal.

The electronic whiteboard 1a, the electronic whiteboard 1b, the relay apparatus 3, the communication management apparatus 5, and the image storage apparatus 7 mutually communicate data through a communication network 200, such as the Internet or a local area network (LAN). The communication network 200 may include a wireless network, in addition to a wired network. In FIG. 2, each of the electronic whiteboard 1a and the electronic whiteboard 1b is an electronic whiteboard configured to transmit and receive conference video data including a site image data for a video conference and audio data.

Hardware Configuration:

A description is now given of a hardware configuration of each apparatus, according to the present embodiment.

Figure 3:
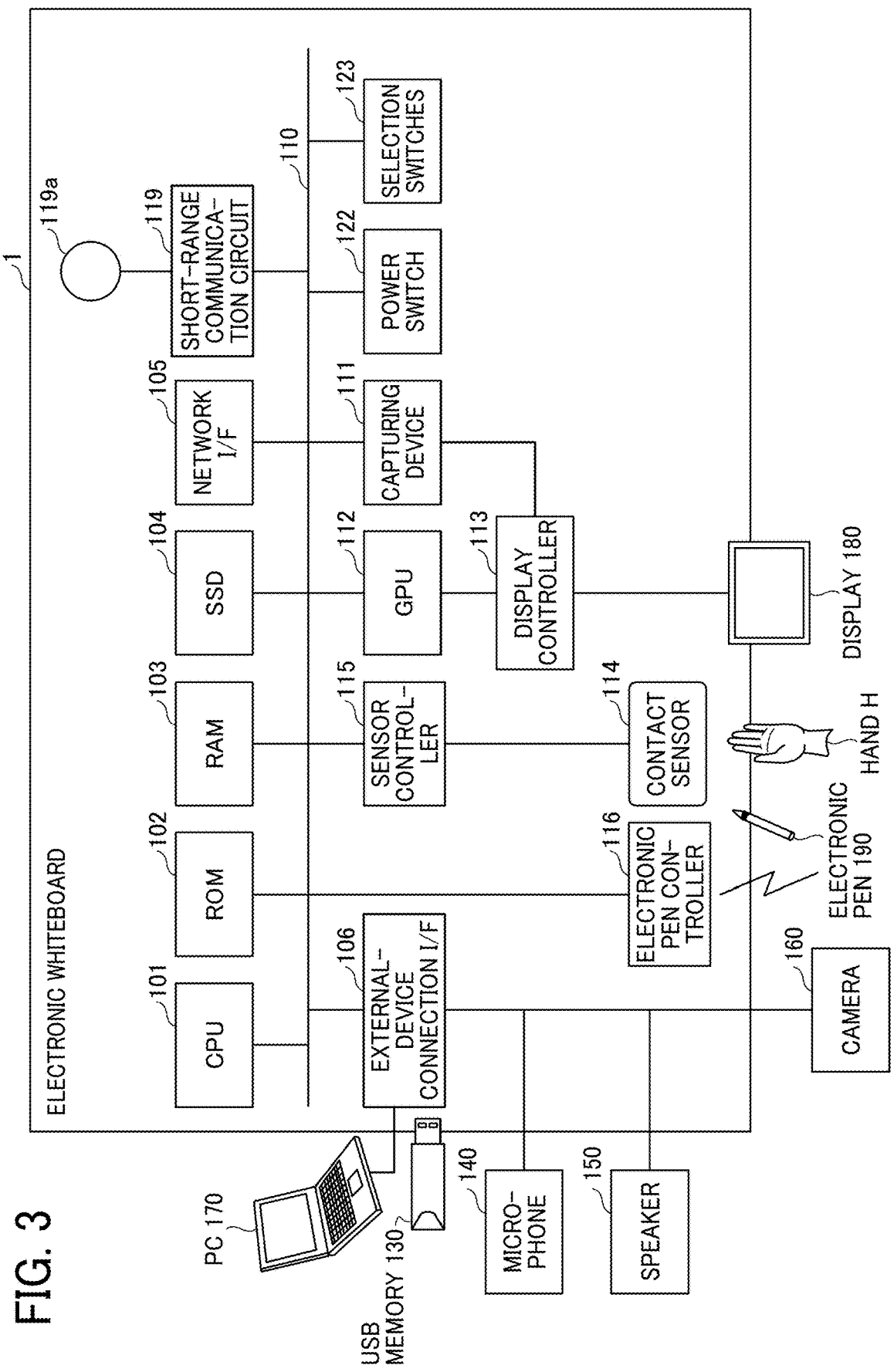
FIG. 3 is a block diagram illustrating an example of a hardware configuration of an electronic whiteboard, according to an embodiment of the present disclosure.

Hardware Configuration of Electronic Whiteboard:

FIG. 3 is a block diagram illustrating an example of a hardware configuration of the electronic whiteboard, according to an embodiment. As illustrated in FIG. 3, the electronic whiteboard 1 includes a central processing unit (CPU) 101, a read only memory (ROM) 102, a random access memory (RAM) 103, a solid state drive (SSD) 104, a network interface (I/F) 105, and an external device connection I/F 106.

The CPU 101 is a processor that controls overall operation of the electronic whiteboard 1. The ROM 102 is a nonvolatile memory in which programs such as an initial program loader (IPL) used for booting the CPU 101, for example, are stored. The RAM 103 is a volatile memory used as a work area for the CPU 101, for example. The SSD 104 is, for example, a large-capacity storage device that stores various types of data such as a program for electronic whiteboard 1.

The network I/F 105 is a communication interface that connects the electronic whiteboard 1 to connecting to the communication network 200 to communicate with other apparatuses. The external device connection I/F 106 is an interface that connects the electronic whiteboard 1 to various external devices. Examples of the extremal devices include a universal serial bus (USB) memory 130, a microphone 140, a speaker 150, a camera 160, and a PC 170.

The electronic whiteboard 1 further includes a capturing device 111, a graphics processing unit (GPU) 112, a display controller 113, a contact sensor 114, a sensor controller 115, an electronic pen controller 116, a short-range communication circuit 119, and an antenna 119*a* for the short-range communication circuit 119, a power switch 122, and selection switches 123.

The capturing device 111 captures (acquires) a display screen displayed on a display of the PC 170, which is external to the electronic whiteboard 1, as a still image or a moving image. The GPU 112 is a semiconductor chip (processor) dedicated to processing a graphical image. The display controller 113 controls display of screens to output an image output from the GPU 112 to the display 180, for example. The contact sensor 114 detects a touch onto the display 180 with an electronic pen 190 or a user's hand H. The sensor controller 115 controls operation of the contact sensor 114.

The contact sensor 114 inputs and senses a coordinate using an infrared blocking system, for example. More specifically, the display 180 is provided with two light receiving elements disposed on both upper side ends of the display 180, and a reflector frame surrounding the sides of the display 180. The light receiving elements emit a plurality of infrared rays in parallel to a surface of the display 180. The light receiving elements receive lights passing in the direction that is the same as an optical path of the emitted infrared rays, which are reflected by the reflector frame. The contact sensor 114 outputs an identifier (ID) of the infrared ray that is blocked by an object (such as the user's hand) after being emitted from the two light receiving elements, to the sensor controller 115. Based on the ID of the infrared ray, the sensor controller 115 detects a specific coordinate that is touched by the object. The electronic pen controller 116 communicates with the electronic pen 190 to detect a touch by the tip or bottom of the electronic pen 190 to the display 180. The short-range communication circuit 119 is a communication circuit that performs short-range wireless communication.

The power switch 122 is a switch that turns on or off the power of the electronic whiteboard 1. The selection switches 123 are a group of switches for adjusting brightness, hue, etc., of display on the display 180, for example.

The electronic whiteboard 1 further includes a bus line 110. The bus line 110 includes an address bus and a data bus. The bus line 110 electrically connects the hardware components such as the CPU 101 illustrated in FIG. 3 to each other and transmits various control signals.

The contact sensor 114 is not limited to the infrared blocking system type, and may be a different type of detector, such as a capacitance touch panel that identifies a contact position by detecting a change in capacitance, or a resistance film touch panel that identifies a contact position by detecting a change in voltage of two opposed resistance films. In another example, the contact sensor 114 may use an electromagnetic induction touch panel that identifies a contact position by detecting electromagnetic induction caused by contact of an object to the display. In addition or in alternative to detecting a touch by the tip or bottom of the electronic pen 190, the electronic pen controller 116 may also detect a touch by another part of the electronic pen 190, such as a part held by a hand of the user.

Figure 4:
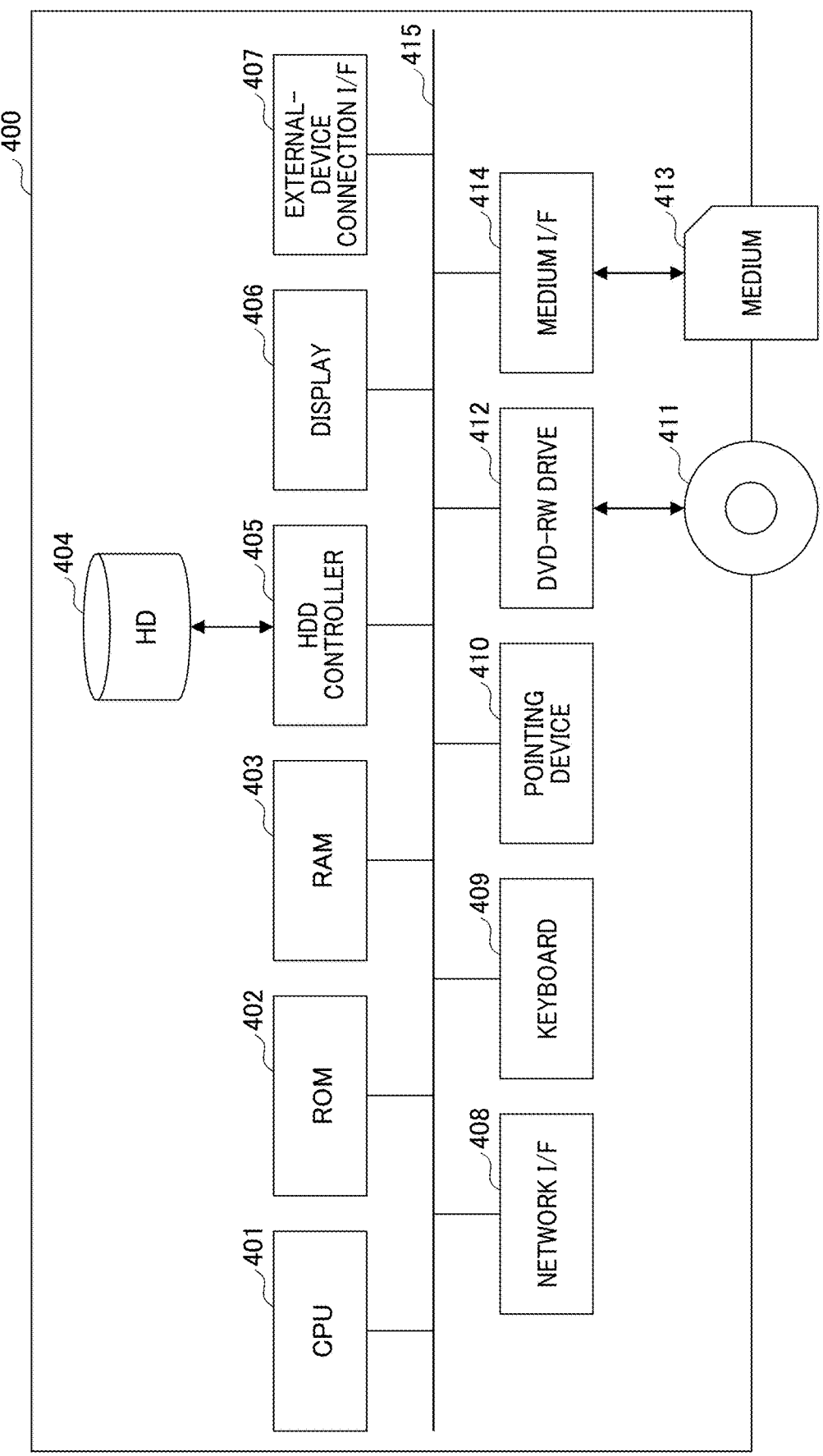
FIG. 4 is a block diagram illustrating a hardware configuration of a computer, according to an embodiment of the present disclosure.

Hardware Configuration of Communication Management Apparatus, Relay Apparatus, Image Storage Apparatus, and PC:

Each of the communication management apparatus 5, the relay apparatus 3, the image storage apparatus 7, and the PC 170 have a hardware configuration of a computer 400 as illustrated in FIG. 4, for example. Alternatively, any one or more of the communication management apparatus 5, the relay apparatus 3, and the image storage apparatus 7 may be implemented by a plurality of computers 400.

FIG. 4 is a block diagram illustrating an example of a hardware configuration of the computer 400, according to an embodiment. The computer 400 includes a CPU 401, ROM 402, a RAM 403, a hard disk (HD) 404, a hard disk drive (HDD) controller 405, a display 406, an external device connection I/F 407, a network I/F 408, a keyboard 409, a pointing device 410, a digital versatile disk-rewritable (DVD-RW) drive 412, a medium I/F 414, and a bus line 415.

The CPU 401 is a processor that controls overall operation of the computer 400. The ROM 402 is, for example, a nonvolatile memory in which programs such as an IPL used for booting the CPU 401 are stored. The RAM 403 is a volatile memory used as a work area for the CPU 401, for example. The HD 404 is a mass storage device that stores an operating system (OS), programs such as applications, and various types of data, for example. The HDD controller 405 controls reading and writing of various data from and to the HD 404 under control of the CPU 401.

The display 406 displays various information such as a cursor, a menu, a window, a character, and an image, for example. The external device connection I/F 407 is an interface that connects the computer 400 to various external devices. The network I/F 408 is a communication interface that controls communication of data through a communication network. The keyboard 409 is one example of an input device provided with a plurality of keys for allowing a user to input characters, numerals, or various instructions. The pointing device 410 is an example of an input device that allows a user to select or execute a specific instruction, select a target for processing, or move a cursor being displayed.

The DVD-RW drive 412 controls reading or writing (storing) of data from or to the DVD-RW 411. Alternatively, the DVD-RW drive 412 may control the reading or writing (storing) of data from or to any different type of disc instead of the DVD-RW 411. The medium I/F 414 controls reading or writing (storing) of data from or to a medium 413 such as a flash memory. The bus line 415 includes an address bus and a data bus. The bus line 415 electrically connects the hardware components such as the CPU 401 illustrated in FIG. 4 to each other and transmits various control signals.

Figure 5:
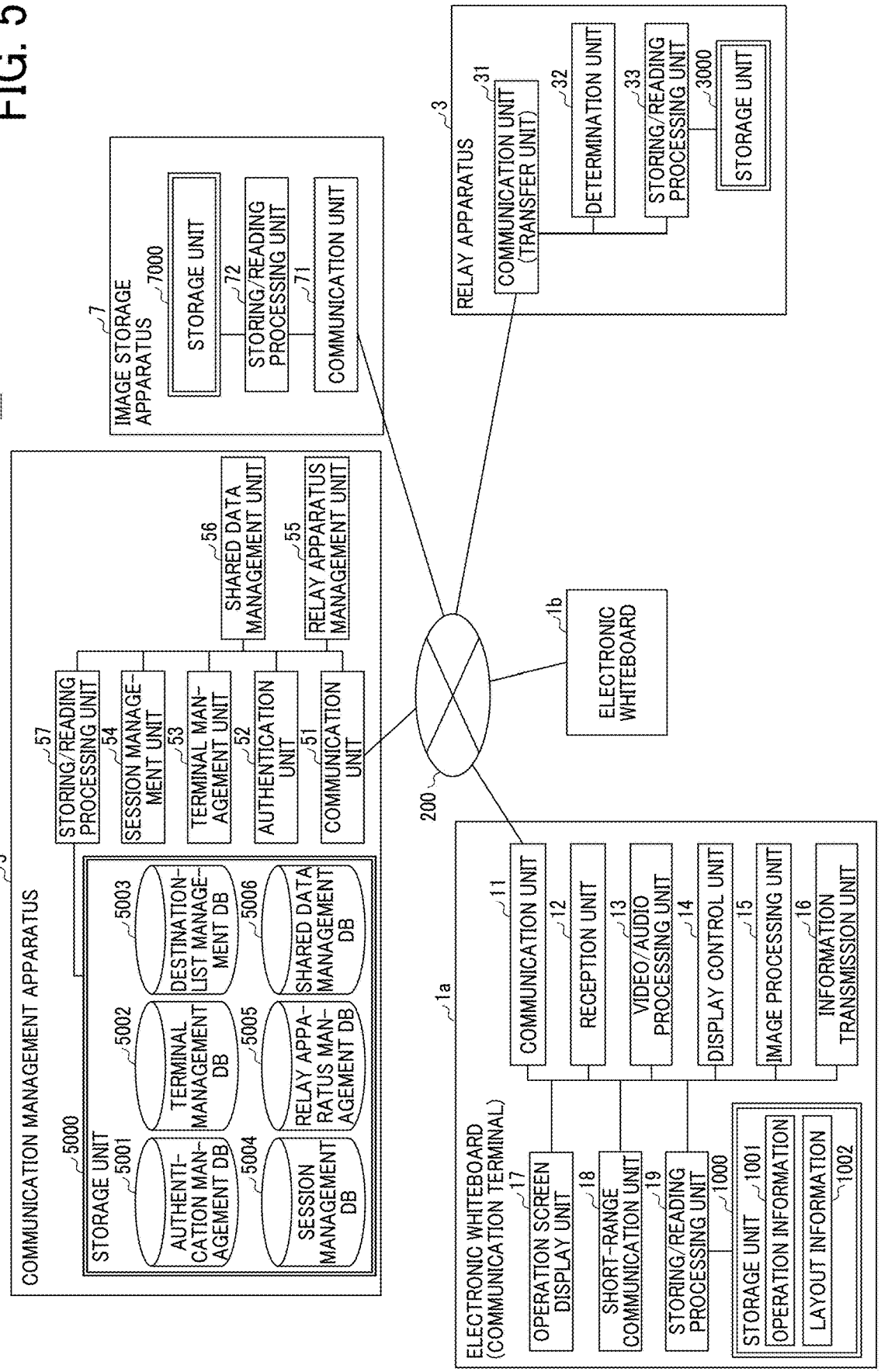
FIG. 5 is a block diagram illustrating an example of a functional configuration of the communication system, according to an embodiment of the present disclosure.

Functional Configuration:

A description is now given of a functional configuration of the communication system 100, according to the present embodiment. FIG. 5 is a block diagram illustrating an example of a functional configuration of the communication system 100, according to an embodiment. In FIG. 5, the electronic whiteboard 1*b* has substantially the same functional configuration as the electronic whiteboard 1*a*.

Functional Configuration of Electronic Whiteboard:

The electronic whiteboard 1 includes a communication unit 11, a reception unit 12, a video/audio processing unit 13, a display control unit 14, an image processing unit 15, an information transmission unit 16, an operation screen display unit 17, a short-range communication unit 18, and a storing/reading processing unit 19. Each of these functional units is implemented by, for example, the CPU 101 of FIG. 3 executing a predetermined program. The electronic whiteboard 1 further includes a storage unit 1000, which is implemented by, for example, the RAM 103 and the SSD 104 of FIG. 3. At least a part of the above functional units may be implemented by hardware.

The communication unit 11 transmits and receives various data or information to and from other terminals, apparatuses, systems, etc. through the communication network 200. The communication unit 11 also functions as a starting unit, which performs a login process to the communication management apparatus 5, and a process of starting communication with another communication terminal.

The reception unit 12 receives various inputs from a user using the electronic pen 190, for example. For example, the reception unit 12 receives a drawing operation of a stroke image, various setting operations, and a selection operation. The reception unit 12 according to the present embodiment further has a function of receiving selection of multiple screens to be displayed on a display unit such as the display 180. A detailed description is given below of an operation performed by the reception unit 12.

The video/audio processing unit 13 performs main processing of the video conference function. For example, the video/audio processing unit 13 performs digital processing such as encoding of image (video) data and audio data in accordance with an output signal from the microphone 140 and an output signal from the camera 160. The video/audio processing unit 13 generates a video signal and an audio signal based on image (video) data and audio data received by the communication unit 11. Further, the video/audio processing unit 13 performs processing for combining image (video) data having different resolutions.

The display control unit 14 outputs a video signal (image signal) to a display unit such as the display 180 and performs control for displaying a display screen. The display control unit 14 according to the present embodiment further has a function of controlling a display unit such as the display 180 to display multiple screens using information on the multiple screens selected by another electronic whiteboard 1 and layout information based on the number of screens of the multiple screens. A detailed description is given below of an operation performed by the display control unit 14.

The image processing unit 15 performs main processing of an electronic whiteboard function. For example, the image processing unit 15 performs a process of creating a stroke image and stroke data based on the stroke of the electronic pen 190 or the like received by the reception unit 12 or a process of creating a stroke image based on the stroke data received by the communication unit 11. The image processing unit 15 further performs a process of creating an image signal based on image data of a document image received by the communication unit 11.

The information transmission unit 16 transmits the stroke data created by the image processing unit 15 to the communication management apparatus 5. The information transmission unit 16 according to the present embodiment further has a function of transmitting operation information including information on multiple screens received by the reception unit 12 to another electronic whiteboard 1 communicating with the electronic whiteboard 1 via the communication management apparatus 5.

In another example, the information transmission unit 16 transmits the operation information to another electronic whiteboard 1 without intervening the communication management apparatus 5. In still another example, the information transmission unit 16 transmits the operation information to the communication management apparatus 5, and the communication management apparatus 5 has a function of transmitting the operation information to another electronic whiteboard 1. In other words, the communication system 100 has any configuration in which the operation information transmitted by the information transmission unit 16 of the electronic whiteboard 1 is transmitted to another electronic whiteboard 1 communicating with the electronic whiteboard 1. A detailed description is given below of an operation performed by the information transmission unit 16.

The operation screen display unit 17 displays an operation screen such as a page list screen 1700 or a selection screen 2300, each being described below, on a display unit such as the display 180.

The short-range communication unit 18 acquires and provides data by short-range wireless communication with each terminal having a short-range communication unit.

The storing/reading processing unit 19 performs processing for storing various types of data in the storage unit 1000 and reading various types of data stored in the storage unit 1000.

Each time image data and audio data are received in performing communication with another terminal, the image data and audio data stored in the storage unit 1000 are overwritten. The display 180 displays an image based on video data before being overwritten, and the speaker 150 outputs sound based on audio data before being overwritten.

The storage unit 1000 according to the present embodiment further stores information such as operation information 1001 and layout information 1002 described below.

Functional Configuration of Communication Management Apparatus:

The communication management apparatus 5 includes a communication unit 51, an authentication unit 52, a terminal management unit 53, a session management unit 54, a relay apparatus management unit 55, a shared data management unit 56, and a storing/reading processing unit 57. Each of these functional units is implemented by, for example, the CPU 401 of FIG. 4 executing a predetermined program. In another example, each of the functional units is implemented by executing a program on a plurality of computers 400. In still another example, at least a part of the functional units is implemented by hardware.

The communication management apparatus 5 further includes a storage unit 5000 implemented by, for example, the HD 504 and the HDD controller 405 of FIG. 4. The storage unit 5000 stores, for example, an authentication management database (DB) 5001, a terminal management DB 5002, a destination list management DB 5003, a session management DB 5004, a relay apparatus management DB 5005, and a shared data management DB 5006.

Authentication Management Table:

FIG. 6 is a diagram illustrating an example of an authentication management table 600, according to an embodiment. In the storage unit 5000, the authentication management DB 5001, which is implemented by the authentication management table 600 as illustrated in FIG. 6, is stored. The authentication management table 600 stores, for each one of the electronic whiteboards 1 managed by the communication management apparatus 5, a terminal ID of the electronic whiteboard and a password in association with each other. For example, the authentication management table 600 illustrated in FIG. 6 indicates that the terminal ID of the electronic whiteboard 1*a* is "01aa" and the password corresponding the terminal ID "01aa" is "aaaa".

The terminal ID is identification information identifying each electronic whiteboard (communication terminal) 1. The terminal ID is an example of identification information used by the communication management apparatus 5 to manage a communication terminal such as the electronic whiteboard 1. In another example, the communication management apparatus 5 manages the electronic whiteboard 1 using a user ID identifying each user, a contract ID identifying a particular contractor, and a communication ID identifying a particular communication source, instead of the terminal ID.

The password is an example of authentication information for authenticating the communication terminal such as the electronic whiteboard 1. In another example, the authentication information is an access token or an electronic certificate, instead of the password.

Terminal Management Table:

FIG. 7 is a diagram illustrating an example of a terminal management table 700, according to an embodiment. In the storage unit 5000, the terminal management DB 5002, which is implemented by the terminal management table 700 as illustrated in FIG. 7, is stored. The terminal management table 700 stores, for each one of the terminal IDs each identifying a particular one of the electronic whiteboards 1, a terminal name to be used when each electronic whiteboard 1 is a destination terminal, an operation state of each electronic whiteboard 1, a reception date and time when login request information described below is received by the communication management apparatus 5 5, and an internet protocol (IP) address of each electronic whiteboard 1 in association with each other.

For example, the terminal management table 700 illustrated in FIG. 7 indicates that the electronic whiteboard 1*a* whose terminal ID is "01aa" has the terminal name "TERMINAL AA, TOKYO BRANCH, JAPAN" and the operation state of the electronic whiteboard 1*a* is "Online (Ready)". Further, the terminal management table 700 indicates that the date and time when the login request information from the electronic whiteboard 1*a* whose terminal ID is "01aa" is received by the communication management apparatus 5 is "13:40 on Apr. 10, 20xx" and the IP address of the electronic whiteboard 1*a* is "1.2.1.3". The terminal ID, the destination name, and the IP address are stored, for example, when each electronic whiteboard 1 is pre-registered to receive service provided by the communication management apparatus 5.

Destination List Management Table:

FIG. 8 is a diagram illustrating an example of a destination list management table 800, according to an embodiment. In the storage unit 5000, the destination list management DB 5003, which is implemented by the destination list management table 800 as illustrated in FIG. 8, is stored. The destination list management table 800 stores the terminal ID of the source terminal (electronic whiteboard 1) that sends a request for a start of communication in association with the terminal IDs of all destination terminals (electronic whiteboards 1) registered as destination terminal candidates for the source terminal in association with each other. For example, the destination list management table 800 illustrated in FIG. 8 indicates that the destination terminal candidates to which the source terminal (electronic whiteboard 1*a*) whose terminal ID is "01aa" can send the request for the start of communication include the electronic whiteboard 1*b* whose terminal ID is "01ba". The destination terminal candidates are updated by addition or deletion in response to an addition or deletion request transmitted from any source terminal to the communication management apparatus 5.

Session Management Table:

FIG. 9 is a diagram illustrating an example of a session management table 900, according to an embodiment. In the storage unit 5000, the session management DB 5004, which is implemented by the session management table 900 as illustrated in FIG. 9, is stored. The session management table 900 stores, for each one of session IDs as identification information identifying a particular session (communication), an apparatus ID of the relay apparatus 3 to be used, the terminal ID of the source terminal, the terminal ID of the destination terminal in association with each other. The session management table 900 further stores, for each one of session IDs, information such as a reception delay time (ms) that occurs when video data is received at the destination terminal and a reception date and time when delay information indicating the delay time is received from the destination terminal in association with each other. For example, the session management table 900 illustrated in FIG. 9 indicates that in the session identified the session ID "se01", the relay apparatus 3 whose apparatus ID is "111a" relays communication between the source terminal whose terminal ID is "01aa" and the destination terminal whose terminal ID is "01ba". Further the session management table 900 of FIG. 9 indicates that in the session identified by the session ID "se01", the delay time of video data at "13:41 on Apr. 10, 20xx" is 200 milliseconds (ms).

Figure 10:
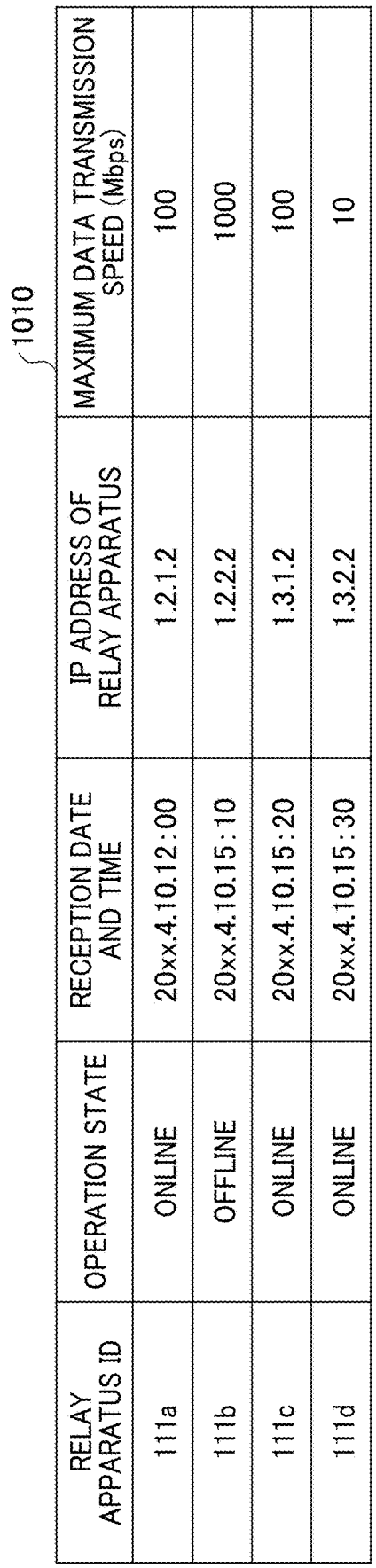
FIG. 10 is a diagram illustrating an example of a relay apparatus management table, according to an embodiment of the present disclosure.

Relay apparatus Management Table:

FIG. 10 is a diagram illustrating an example of a relay apparatus management table 1010, according to an embodiment. In the storage unit 5000, the relay apparatus management DB 5005, which is implemented by the relay apparatus management table 1010 as illustrated in FIG. 10, is stored. The relay apparatus management table 1010 stores, for each one of the relay apparatuses, the relay apparatus ID, the operation state of the relay apparatus 3, the date and time when state information indicating the operation state is received, an IP address of the relay apparatus 3, and maximum data transmission speed (Mbps) of the relay apparatus 3, in association with each other. For example, the relay apparatus management table 1010 illustrated in FIG. 10 indicates that the relay apparatus 3 whose relay apparatus ID is "111a" has the operation state "Online", and the date and time when the communication management apparatus 5 received the state information is "12:00 on Apr. 10, 20xx". The relay apparatus management table 1010 illustrated in FIG. 10 further indicates that the IP address of the relay apparatus 3 whose relay apparatus ID is "111a" is "1.2.1.2" and the maximum data transmission speed of the relay apparatus 3 is 100 Mbps.

Shared Data Management Table:

FIG. 11 is a diagram illustrating an example of a shared data management table 1100, according to an embodiment. In the storage unit 5000, the shared data management DB 5006, which is implemented by the shared data management table 1100 as illustrated in FIG. 11, is stored. The shared data management table 1100 stores, for each one of the session IDs each identifying a particular one of sessions (communication) in which each electronic whiteboard 1 (communication terminal) and the relay apparatus 3 perform mutual communication, various types of data on multiple screens shared between the electronic whiteboards 1.

The data stored in the shared data management table 1100 includes, for example, an ID identifying each data record, a sequence number indicating an order in which data records are generated, a "body" as information indicating a content of the data record, and a "parent" as information identifying parent data. For example, the shared data management table 1100 illustrated in FIG. 11 stores, in association with the session ID "se01", information (children) indicating pages generated in the session and information (current page) indicating a page currently being displayed.

The shared data management table 1100 further stores display screen information for displaying one or more display screens displayed by the electronic whiteboard 1.

Figure 12:
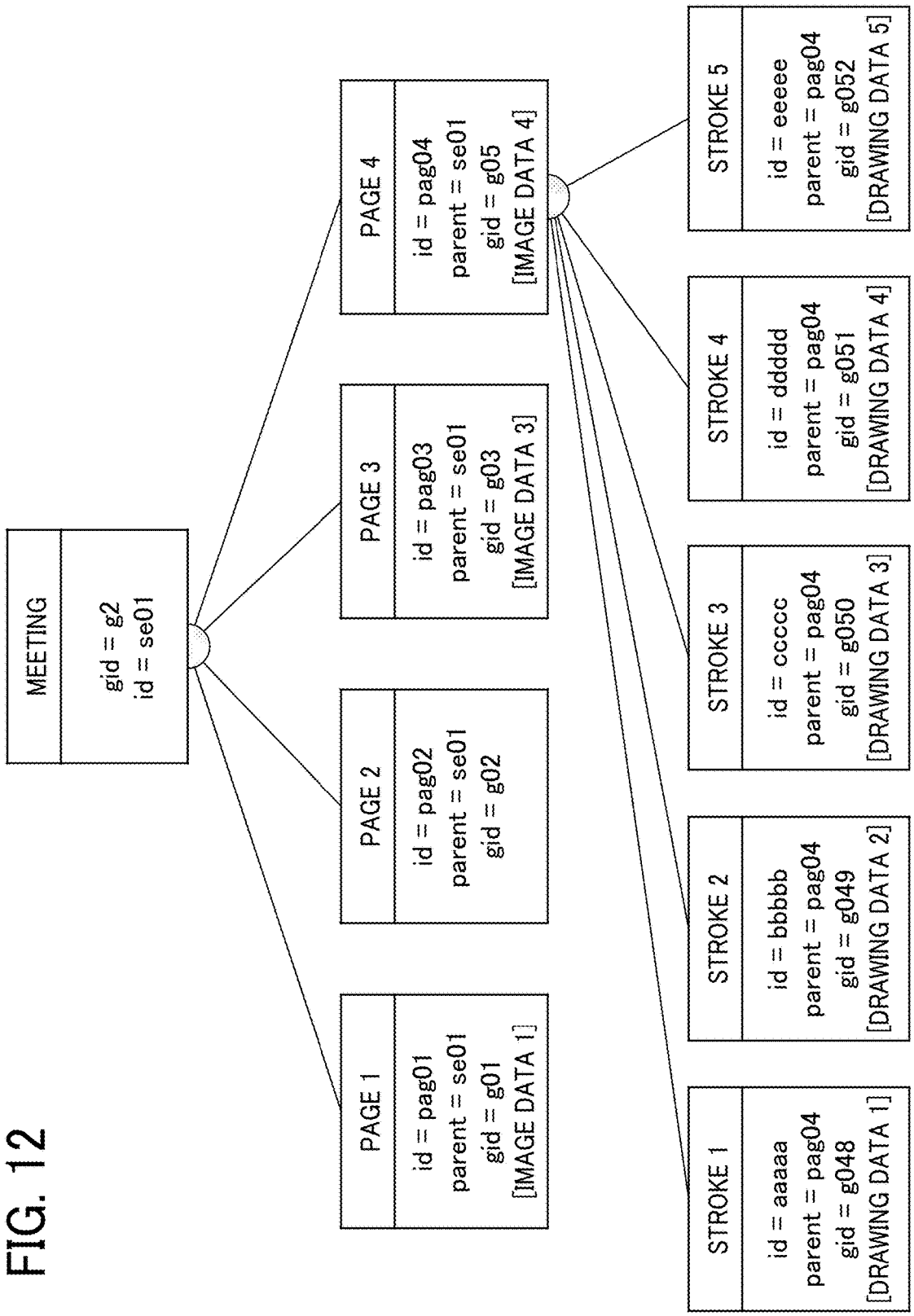
FIG. 12 is an illustration for describing display screen information, according to an embodiment of the present disclosure.

Display Screen Information:

FIG. 12 is an illustration for describing the display screen information 1200, according to an embodiment. As illustrated in the display screen information 1200 of FIG. 12, a display screen displayed on the electronic whiteboard 1 has a hierarchical structure of "meeting", "page (Page 1 to Page 4)", and "stroke" (Stroke 1 to Stroke 5)", for example. The "stroke" corresponds to stroke data in the present embodiment, and is managed for each "page". The "page" represents a state in which image data associated with a one-page screen (display screen) displayed on the display 180 is stored. The "conference" represents information on a conference (session) being conducted by the electronic whiteboard 1. The electronic whiteboard 1 can switch from one page to other page, and the "page" corresponds to each page of screens displayed at the electronic whiteboard 1. For example, Page 1 includes a page ID (id=pag01) for identifying Page 1, information (parent=se01) for identifying a "conference" being conducted by the electronic whiteboard 1, and a gid "g01" for identifying a page (page data), and Image data 1.

Each Functional Unit of Communication Management Apparatus:

Referring again to FIG. 5, a description is now given of each of the functional units of the communication management apparatus 5.

The communication unit 51 transmits and receives various data or information to and from other terminals, apparatuses, or systems through the communication network 200. For example, the communication unit 51 has a function of receiving operation information including information on multiple screens transmitted from the electronic whiteboard 1a and transferring (transmitting) the received operation information to another electronic whiteboard 1b communicating (participating in the same conference) with the electronic whiteboard 1a. In substantially the same manner, the communication unit 51 receives operation information including information on multiple screens to be shared, which is transmitted from the electronic whiteboard 1b, and transfers the received operation information to another electronic whiteboard 1a communicating (participating in the same conference) with the electronic whiteboard 1b.

The operation information transmitted by the electronic whiteboard 1 includes at least information of "current page" indicating a screen currently being displayed at the electronic whiteboard 1 in the shared data management table 1100 illustrated in FIG. 11, for example.

The authentication unit 52 authenticates a login request received via the communication unit 51. For example, when a combination of the terminal ID and the password included in the login request received from the electronic whiteboard 1 is stored in the authentication management table 600 illustrated in FIG. 6, the authentication unit 52 permits the login of the electronic whiteboard 1.

The terminal management unit 53 manages the terminal management DB 5002. For example, the terminal management unit 53 updates information such as the operation state, the reception date and time, and the IP address of the terminal in the terminal management table 700 illustrated in FIG. 7 in accordance the state of the electronic whiteboard 1.

The terminal management unit 53 further manages the destination list management table 800. For example, the terminal management unit 53 provides destination list information including the terminal ID(s) of the destination terminal(s) stored in the destination list management table 800 as illustrated in FIG. 8, in response to a request from the electronic whiteboard 1.

The session management unit 54 manages a session such as communication or a conference conducted in the communication system 100. For example, the session management unit 54 generates a session ID identifying a session in response to start request information requesting the start of from the electronic whiteboard 1. Further, the session management unit 54 stores various information on a session, for example, in the session management table 900 as illustrated in FIG. 9 in association with the corresponding session ID.

The relay apparatus management unit 55 manages the relay apparatus management DB 5005. For example, the relay apparatus management unit 55 selects a particular relay apparatus 3 to be used for relaying data in the session using the relay apparatus management table 1010 as illustrated in FIG. 10. For example, the relay apparatus management unit 55 selects the particular relay apparatus 3 residing near the source terminal, based on the IP address of each relay apparatus 3 stored in the relay apparatus management table 1010 and the IP address of the source terminal. In another example, the relay apparatus management unit 55 selects the particular relay apparatus 3 based on the maximum data transmission speed of each relay apparatus 3 stored in the relay apparatus management table 1010.

In the present embodiment, the relay apparatus 3 used for relaying data in the session may be selected in any other method. In still another example, the communication system 100 includes one relay apparatus 3 and uses the same relay apparatus 3 in each session.

The shared data management unit 56 manages the shared data management table 1100 as illustrated in FIG. 11, for example. For example, the shared data management unit 56 stores stroke data transmitted in the session sei from the electronic whiteboard 1 participating in the conference (session) in the shared data management table 1100 in association with the session ID.

The storing/reading processing unit 57 performs processing for storing various types of data in the storage unit 5000 and reading various types of data stored in the storage unit 5000.

Functional Configuration of Image Storage Apparatus:

The image storage apparatus 7 includes a communication unit 71 and a storing/reading processing unit 72. Each of these functional units is implemented by, for example, by the CPU 401 of FIG. 4 executing a predetermined program. The image storage apparatus 7 further includes a storage unit 7000 implemented by, for example, the RAM 403, the HD 404, and the HDD controller 405 of FIG. 4.

The communication unit 71 transmits and receives various data or information to and from other terminals, apparatuses, systems, etc. through the communication network 200. The storing/reading processing unit 72 stores various types of data in the storage unit 7000 or reads various types of data stored in the storage unit 7000.

The image storage apparatus 7 having the above-described configuration stores, for example, image data uploaded from the electronic whiteboard 1 in a designated uniform resource locator (URL) and provides the image data stored in the designated URL in response to a request from the electronic whiteboard 1.

Functional Configuration of Relay Apparatus:

The relay apparatus 3 includes a communication unit (transfer unit) 31, a determination unit 32, and a storing/reading processing unit 33. Each of these functional units is implemented by, for example, by the CPU 401 of FIG. 4 executing a predetermined program. The relay apparatus 3 further includes a storage unit 3000 implemented by, for example, the RAM 403, the HD 404, and the HDD controller 405 of FIG. 4.

The communication unit (transfer unit) 31 transmits and receives various data or information to and from other terminals, apparatuses, systems, etc. through the communication network 200. The communication unit (transfer unit) 31 also function as a transfer unit. For example, the communication unit (transfer unit) 31 transfers, for example, video data and/or audio data received from the electronic whiteboard 1 to another electronic whiteboard 1 participating in the same session. The determination unit 32 performs various determinations such as determination of whether data transmission is delayed.

The storing/reading processing unit 33 performs processing for storing various types of data in the storage unit 3000 and reading various types of data stored in the storage unit 3000.

Note that each functional configuration of the communication system 100 illustrated in FIG. 5 is merely one example, and various modifications or applications can be made. In one example, the functional units of the communication management apparatus 5 may be implemented by a plurality of computers 400. In another example, the electronic whiteboard (communication terminal) 1 includes one or more of the functional units of the communication management apparatus 5. In still another example, the communication management apparatus 5 includes one or more of the functional units of the electronic whiteboard (communication terminal) 1.

In still another example, the function of the image storage apparatus 7 may be implemented by a storage server that is external to or resides in the communication system 100. In still another example, the communication management apparatus 5 includes one or more of the functional units of each of the image storage apparatus 7 and the relay apparatus 3. Further, the electronic whiteboard 1 is an example of a communication terminal, and the communication terminal may be, for example, an information terminal that executes an application that supports the communication system 100.

Operation:

A description is now given of an example of an operation of managing communication and an operation of sharing a screen, according to an embodiment.

Figure 13:
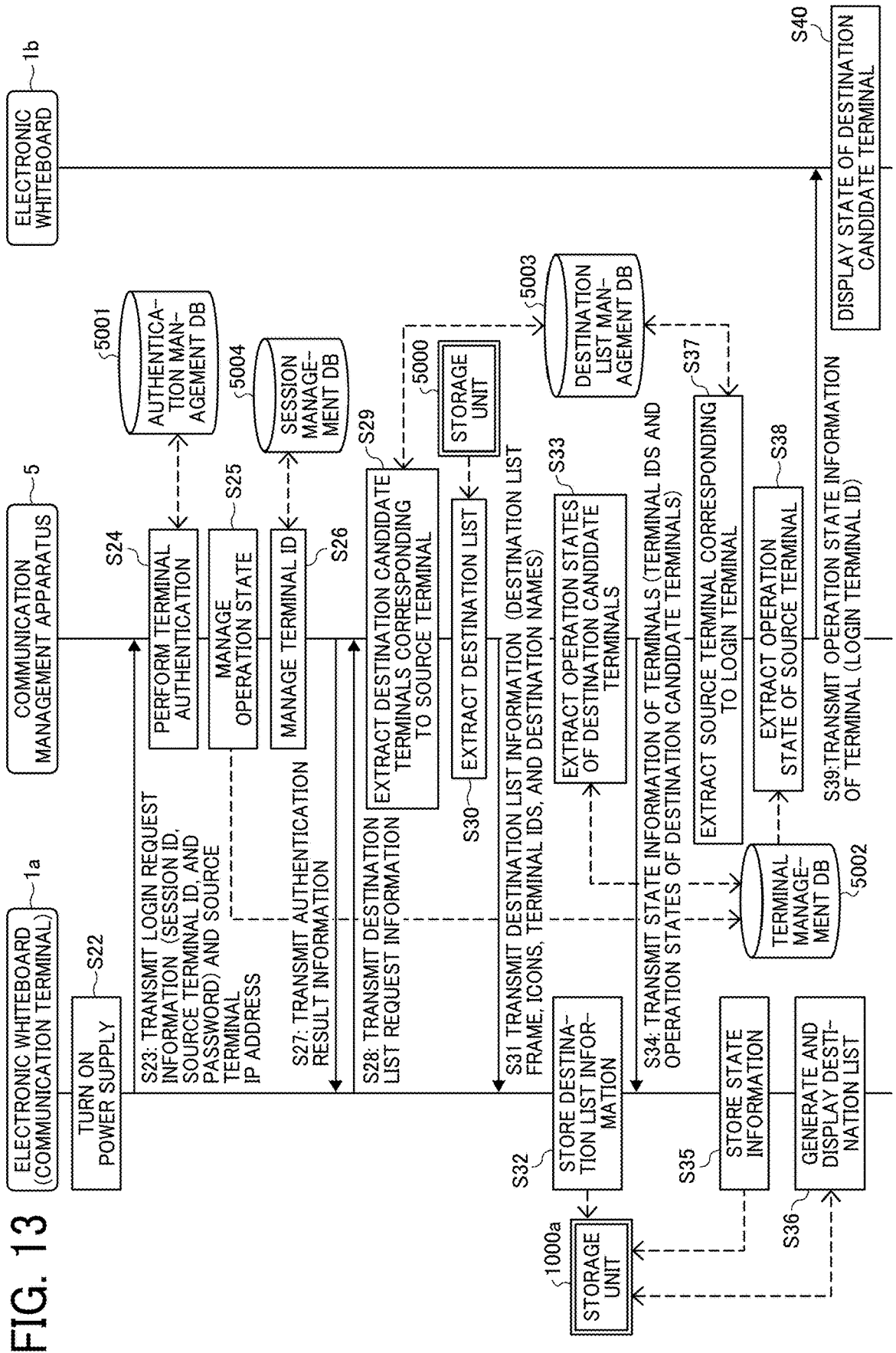
FIG. 13 is a sequence diagram illustrating an example of an operation performed in preparation, according to an embodiment of the present disclosure.

Preparation Operation:

FIG. 13 is a sequence diagram illustrating an example of an operation performed in preparation, according to an embodiment. This operation is an example of a preparation operation performed before the electronic whiteboard 1 participates in a session (communication) such as a teleconference in the communication system 100.

As the power switch 122 of the electronic whiteboard 1a is turned on, the reception unit 12 receives a request to turn on the power of the electronic whiteboard 1a (step S22).

Next, the communication unit 11 transmits login request information requesting a login to the communication management apparatus 5 through the communication network 200 (step S23). This login request information includes the terminal ID and password of the electronic whiteboard 1a.

Next, the authentication unit 52 of the communication management apparatus 5 searches the authentication management table 600 as illustrated in FIG. 6 by using the communication ID and the password included in the login request information received via the communication unit 51 as search keys. When the combination of the terminal ID and the password included in the login request information is registered in the authentication management table 600, the authentication unit 52 permits the login of the electronic whiteboard 1a (step S24). When the combination of the terminal ID and the password included in the login request information is registered in the authentication management table 600, the processes of step S25 and the subsequent steps are to be performed.

When the login of the electronic whiteboard 1a is permitted, the terminal management unit 53 updates information corresponding to the terminal ID "01aa" of the electronic whiteboard 1a in the terminal management table 700 as illustrated in FIG. 7. For example, the terminal management unit 53 changes information of the operation state associated with the terminal ID "01aa" to "Online (Ready)" and updates the reception date and time to indicate the date and time when the login request information is received (step S25). Note that the IP address of the communication terminal (electronic whiteboard) in the terminal management table 700 may not be the IP address that is previously registered, but may be the IP address that is transmitted from the electronic whiteboard 1a in step S23. As a result, in the terminal management table 700, the terminal ID "01aa", the operation state "Online (Ready)", the reception date and time "20xx.4.10.13:40", and the IP address "1.2.1.3" are stored in association with each other, as illustrated in FIG. 7.

The session management unit 54 adds a new record including the terminal ID "01aa" of the electronic whiteboard 1a received in step S23 as the "terminal ID of source terminal" in the session management table 900 as illustrated in FIG. 9 (step S26). The communication unit 51 of the communication management apparatus 5 transmits the authentication result obtained at step S24 to the electronic whiteboard 1a that has sent the login request through the communication network 200 (step S27).

In response to receiving the authentication result indicating that login of the communication terminal (electronic whiteboard 1a) is permitted, the communication unit 11 of the electronic whiteboard 1a transmits destination list request information indicating a request for a destination list to the communication management apparatus 5 through the communication network 200 (step S28). Accordingly, the communication unit 51 of the communication management apparatus 5 receives the destination list request information.

Next, the terminal management unit 53 searches the destination list management table 800 as illustrated in FIG. 8 using the terminal ID "01aa" of the electronic whiteboard 1a as a search key, to read the terminal ID(s) of one or more destination terminal candidates that can communicate with the electronic whiteboard 1a. The terminal management unit 53 further read the destination name(s) associated with the terminal ID(s) of the one or more destination terminal candidates from the terminal management table 700 as illustrated in FIG. 7 (step S29). Thus, the terminal ID and terminal name of each of the destination terminal candidates corresponding to the terminal ID "01aa" of the electronic whiteboard 1a are extracted.

Next, the communication unit 51 of the communication management apparatus 5 reads, for example, destination list frame data and icon data indicating the operation state stored in the storage unit 5000 through the storing/reading processing unit 57 (step S30). Further, the communication unit 51 of the communication management apparatus 5 transmits destination list information including the destination list frame and the icons being read, and the terminal IDs and the terminal names extracted in step S29, to the electronic whiteboard 1a (step S31). Accordingly, the communication unit 11 of the electronic whiteboard 1a receives the destination list information. The storing/reading processing unit 19 of the electronic whiteboard 1a stores the destination list information that is received in the storage unit 1000 (step S32).

As described above, in the present embodiment, the communication management apparatus 5 centrally manages the destination list information of all terminals, instead of that each electronic whiteboard 1 manages the destination list information. Accordingly, for example, when a new electronic whiteboard 1 is registered in the communication management apparatus 5, when the electronic whiteboard 1 already included in the communication system is replaced with a communication terminal of a new model, or when appearance of the destination list frame is to be changed, time and efforts for changing the destination list information by each electronic whiteboard 1 are saved.

Further, the terminal management unit 53 of the communication management apparatus 5 searches the terminal management table 700 as illustrated in FIG. 7 using the terminal ID(s) of the destination terminal candidate(s) extracted in step S29 as a search key, to read the operation state associated with each of the terminal ID(s) of the destination terminal candidate(s). By this searching, the terminal management unit 53 acquires the operation state of each electronic whiteboard 1 associated with the terminal ID of each destination terminal candidate (step S33).

Next, the communication unit 51 of the communication management apparatus 5 transmits terminal state information including the terminal ID(s) used as the search key in step S33 and the operation states of the corresponding destination terminal(s) through the communication network 200 to the electronic whiteboard 1a (step S34).

Next, the storing/reading processing unit 19 of the electronic whiteboard 1a successively stores the operation state information of the terminals received from the communication management apparatus 5 in the storage unit 1000 (step S35). Thus, the electronic whiteboard 1a acquires the operation state(s) of the destination terminal candidate(s) such as the electronic whiteboard 1b or an electronic whiteboard 1c that is currently available to communicate with the electronic whiteboard 1a.

Next, the display control unit 14 of the electronic whiteboard 1a creates a destination list reflecting the operation state(s) of the terminal(s) as the destination terminal candidate(s) based on the destination list information and the operation state information of the terminal(s) stored in the storage unit 1000. Further, the display control unit 14 controls the display 180 of the electronic whiteboard 1a to display a destination list screen using the created destination list (step S36).

The terminal management unit 53 of the communication management apparatus 5 searches the destination list management table 800 as illustrated in FIG. 8 based on the terminal ID "01aa" of the electronic whiteboard 1a, to extract the terminal ID(s) of other communication terminal(s) that registers the electronic whiteboard 1 as the destination terminal candidate (step S37).

Next, the terminal management unit 53 of the communication management apparatus 5 searches the terminal management table 700 as illustrated in FIG. 7 based on the terminal ID "01aa" of the electronic whiteboard 1a, to acquire the operation state of the electronic whiteboard 1a (step S38).

The communication unit 51 transmits the terminal state information including the terminal ID and operation state of the electronic whiteboard 1a, to the communication terminal(s) whose operation state is "Online" in the terminal management table 700 among the electronic whiteboard(s) 1 identified by the terminal ID(s) extracted in step S37 (step S39). When transmitting the terminal status information to each electronic whiteboard 1, the communication unit 51 refers to the IP address of each electronic whiteboard 1 stored in the terminal management table 700 based on each terminal ID. Thus, the terminal ID "01aa" and the operation state "Online" of the electronic whiteboard 1a are transmitted to each of the other electronic whiteboards 1 that are available to communicate with the electronic whiteboard 1a as a destination terminal candidate. Accordingly, the state of the electronic whiteboard 1a is displayed at each of the other electronic whiteboards 1 as the destination terminal candidates (step S40).

Figure 14:
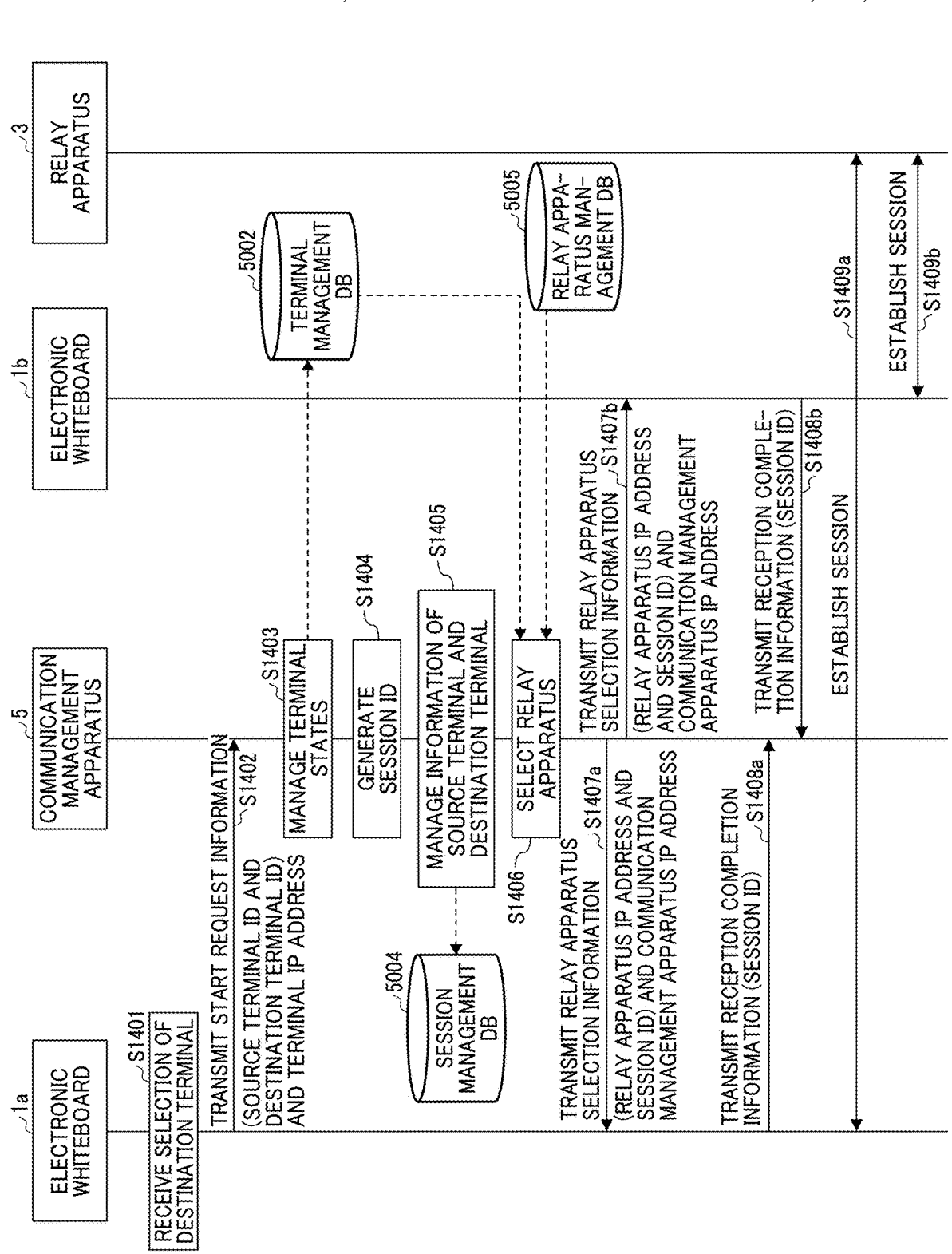
FIG. 14 is a sequence diagram illustrating an example of an operation of starting a session, according to an embodiment of the present disclosure.

Operation of Starting Session:

FIG. 14 is a sequence diagram illustrating an example of an operation of starting a session, according to an embodiment. FIG. 14 illustrates an example of the operation of starting a session performed by the communication system 100 when the electronic whiteboard 1a requests the electronic whiteboard 1b to start a session (communication).

When the electronic whiteboard 1a as a source terminal receives selection of a destination terminal input by User A1 in step S1401, processes of step S1402 and subsequent steps are to be performed. The following description is given of an example in which User A1 selects the electronic whiteboard 1b as the destination terminal.

In step S1402, when the electronic whiteboard 1a receives the destination selection input by User A1, the communication unit 11 of the electronic whiteboard 1a transmits start request information requesting a start of a session to the communication management apparatus 5. The start request information includes the terminal ID "01aa" of the electronic whiteboard 1a as the source terminal, the terminal ID "01ba" of the electronic whiteboard 1b as the destination terminal, and the IP address of the electronic whiteboard 1a as the source terminal. Accordingly, the communication unit 51 of the communication management apparatus 5 receives the start request information and the IP address of the source terminal (electronic whiteboard 1a), which is a transmission source of the start request information.

In step S1403, the terminal management unit 53 of the communication management apparatus 5 updates the terminal management DB 5002 based on the terminal ID of the source terminal and the terminal ID of the destination terminal included in the start request information. For example, the terminal management unit 53 updates the terminal management table 700, to change the operation states associated with the terminal IDs "01aa" and "01ba" to "Online (Busy)", based on the terminal ID "01aa" of the source terminal and the terminal ID "01ba" of the destination terminal included in the start request information. In this state, although a session between the electronic whiteboard 1a as the source terminal and the electronic whiteboard 1b as the destination terminal is not established yet, the operation state of each terminal is managed as communicating.

In step S1404, the session management unit 54 of the communication management apparatus 5 creates a session ID for identifying a session established between the electronic whiteboard 1a and the electronic whiteboard 1b. In this example, the session management unit 54 creates the session ID "se01".

In step S1405, the session management unit 54 stores the created session ID, the terminal ID "01aa" of the source terminal, and the terminal ID "01ba" of the destination terminal in association with each other in the session management table 900 as illustrated in FIG. 10.

In step 1406, the relay apparatus management unit 55 of the communication management apparatus 5 selects the relay apparatus 3 that is to relay the session between the source terminal (electronic whiteboard 1a) and the destination terminal (electronic whiteboard 1b). For example, the relay apparatus management unit 55 refers to the relay apparatus management table 1010 to identify the relay apparatus IDs of the relay apparatuses 3 each having the operation state "Online", and selects one of these relay apparatus 3 having an IP address closest to the IP address of the source terminal (electronic whiteboard 1a) in the terminal management table 700. In this example, the relay apparatus 3 identified by the relay apparatus ID "111a" is selected.

In steps S1407a and S1407b, the session management unit 54 of the communication management apparatus 5 transmits relay apparatus selection information to the source terminal (electronic whiteboard 1a) and the destination terminal (electronic whiteboard 1b) via the communication unit 51. This relay apparatus selection information includes the IP address of the relay apparatus 3 selected in step S1406, the session ID generated in step S1404, and the IP address of the communication management apparatus 5.

In steps S1408a and S1408b, in response to receiving the relay apparatus selection information, the communication unit 11 of the source terminal (electronic whiteboard 1a) and the communication unit 11 of the destination terminal (electronic whiteboard 1b) transmit, to the communication management apparatus 5, reception completion information indicating that the relay apparatus selection information is received. This reception completion information includes the session ID "se01" included in the relay apparatus selection information.

In steps S1409a and S1409b, the communication unit 11 of the source terminal (electronic whiteboard 1a) and the communication unit 11 of the destination terminal (electronic whiteboard 1b) establish a session with the relay apparatus 3 using the apparatus ID of the relay apparatus 3 and the session ID included in the relay apparatus selection information. Thus, the electronic whiteboard 1a and the electronic whiteboard 1b participate in the same session identified by the session ID "se01", and exchange video data such as conference video and audio data with each other via the relay apparatus 3.

The processes described above with reference to FIG. 14 allows User A1 and User B to exchange conference video, etc., using the electronic whiteboard 1a and the electronic whiteboard 1b.

Operation of Sharing Stroke Image

In the communication system 100, when User A1, User B1, and User B2 are participating in the same conference (session), the electronic whiteboard 1a displays, as a shared image, a stroke image drawn by User B1 or User B2 on the electronic whiteboard 1b with the electronic pen 190, for example. In substantially the same manner, the electronic whiteboard 1b displays, as a shared image, a stroke image drawn by User A1 on the electronic whiteboard 1a with the electronic pen 190, for example. In the following description, an example operation of sharing of sharing a stroke image between the electronic whiteboard 1a and the electronic whiteboard 1b participating in the same session is described.

Figure 15:
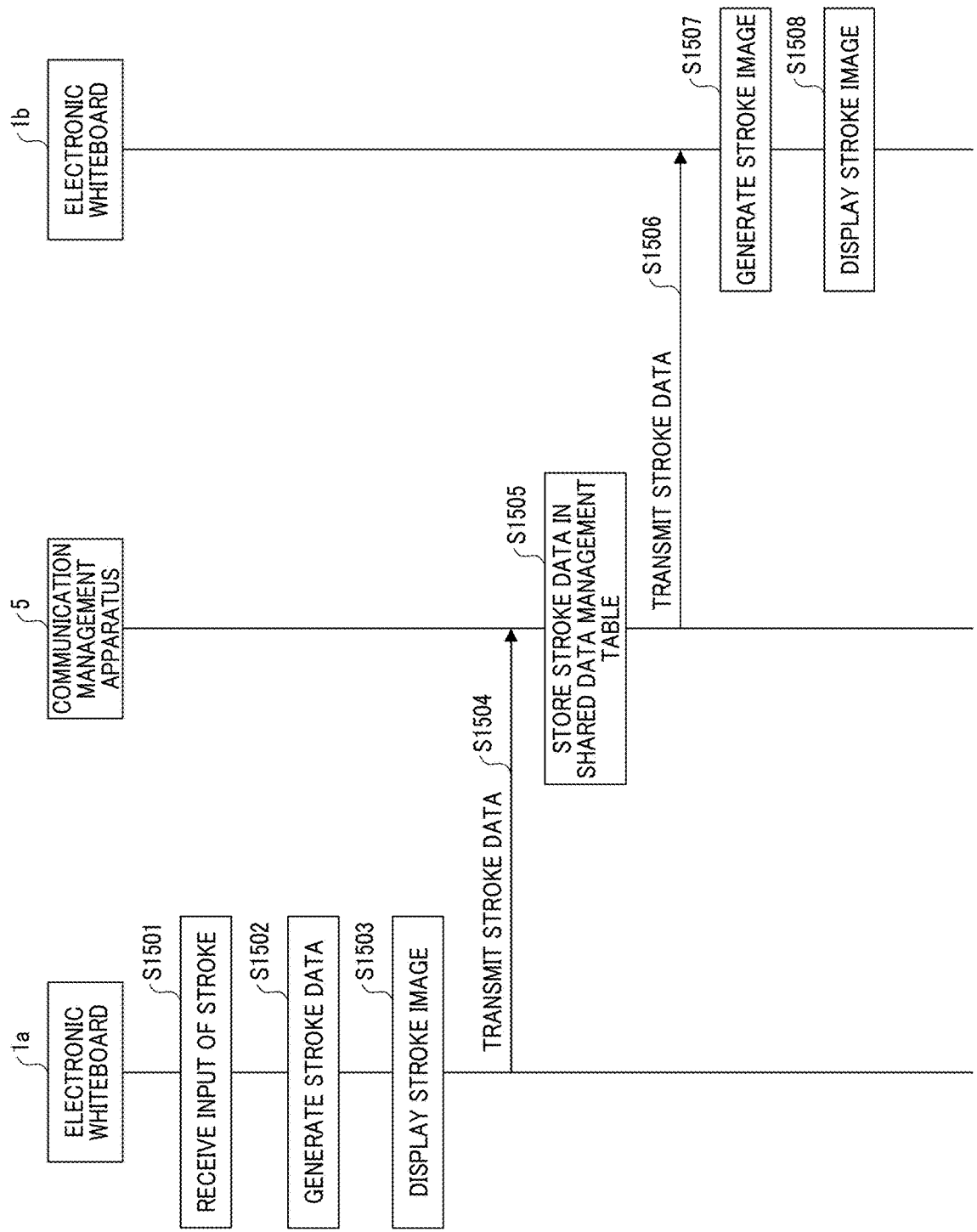
FIG. 15 is a sequence diagram illustrating an example of an operation of sharing a stroke image, according to an embodiment of the present disclosure.

FIG. 15 is a sequence diagram illustrating an example of an operation of sharing a stroke image, according to an embodiment. It is assumed that at the start point of the operation illustrated in FIG. 15, the electronic whiteboard 1a and the electronic whiteboard 1b participate in the same session as a result of the session start operation described above with reference to FIG. 14. Further, it is assumed that the electronic whiteboard 1a and the electronic whiteboard 1b share a document image via the image storage apparatus 7 and display the document image on the display 180, as needed.

In step S1501, as User A1 moves the electronic pen 190 or the hand H in contact with the display 180 of the electronic whiteboard 1a to draw a stroke, the reception unit 12 receives an input of the drawn stroke (trajectory).

In step S1502, the image processing unit 15 on the electronic whiteboard 1a creates stroke data for displaying a stroke image corresponding to the stroke received by the reception unit 12. This stroke data includes coordinate data, line width data, line color data, and vector data for reproducing the stroke image, as described above.

In step S1503, the display control unit 14 of the electronic whiteboard 1a controls a display unit such as the display 180 to display a stroke image based on the stroke data created by the image processing unit 15. The display 180 of the electronic whiteboard 1a is an example of a first display. Thus, the stroke image drawn on the display 180 by User A1 with the electronic pen 190, for example, is displayed on the display 180 on the electronic whiteboard 1a.

In step S1504, the information transmission unit 16 of the electronic whiteboard 1a transmits the stroke data for reproducing the stroke image drawn by User A1 to the communication management apparatus 5 via the communication unit 11 through a session sei, for example. Thus, the communication unit 51 of the communication management apparatus 5 receives the stroke data transmitted from the electronic whiteboard 1a.

In step S1505, the shared data management unit 56 of the communication management apparatus 5 registers the stroke data received from the electronic whiteboard 1a in the shared data management table 1100 as illustrated in FIG. 11.

In step S1506, the communication unit 11 (or the shared data management unit 56) of the communication management apparatus 5 transfers the stroke data received from the electronic whiteboard 1a to the electronic whiteboard 1b participating in the same session as the electronic whiteboard 1a, in parallel with the process of step S1505. Thus, the communication unit 11 of the electronic whiteboard 1b receives the stroke data transmitted by the electronic whiteboard 1a.

In step S1507, the image processing unit 15 of the electronic whiteboard 1b creates a stroke image based on the stroke data received by the communication unit 11.

In step S1508, the display control unit 14 of the electronic whiteboard 1b controls a display unit such as the display 180 to display the stroke image created by the image processing unit 15, i.e., the stroke image drawn by User A in step S1501. The display of the electronic whiteboard 1b is an example of a second display.

In substantially the same manner, when User B1 or User B2 draws a stroke image on the electronic whiteboard 1b with the electronic pen 190, for example, the drawn stroke image is displayed on the electronic whiteboard 1a.

Thus, in the communication system 100, a stroke image is shared between the electronic whiteboard 1a and the electronic whiteboard 1b participating in the same session.

Operation of Sharing Multiple Screens:

As a result of the operations described above, the communication system 100 stores information of multiple images (pages) shared by a plurality of electronic whiteboards including the electronic whiteboard 1a and the electronic whiteboard 1b participating in a conference (session) in the shared data management table 1100 as illustrated in FIG. 11. This enables the electronic whiteboard 1c to display the same shared screen as the one displayed at the electronic whiteboard 1a and the electronic whiteboard 1b based on the information stored in the shared data management table 1100, when the electronic whiteboard 1c newly participates in a conference in which the electronic whiteboard 1a and the electronic whiteboard 1b are already participating.

However, in the conventional system, there is a drawback that multiple screens (pages) selected and displayed at the electronic whiteboard 1a are not shared with another electronic whiteboard such as the electronic whiteboard 1b. For example, when User A1 using the electronic whiteboard 1a is going to make a discussion while comparing multiple screens, User A sometimes has to request User B1 and User B2 using the electronic whiteboard 1b to display the multiple screens.

In the following, a description is given of an operation of sharing multiple screens displayed by the electronic whiteboard 1a with another electronic whiteboard such as the electronic whiteboard 1b in the communication system 100. In other words, an operation of causing the electronic whiteboard 1b to display the multiple screens displayed by the electronic whiteboard 1a is described.

First Embodiment

Figure 16:
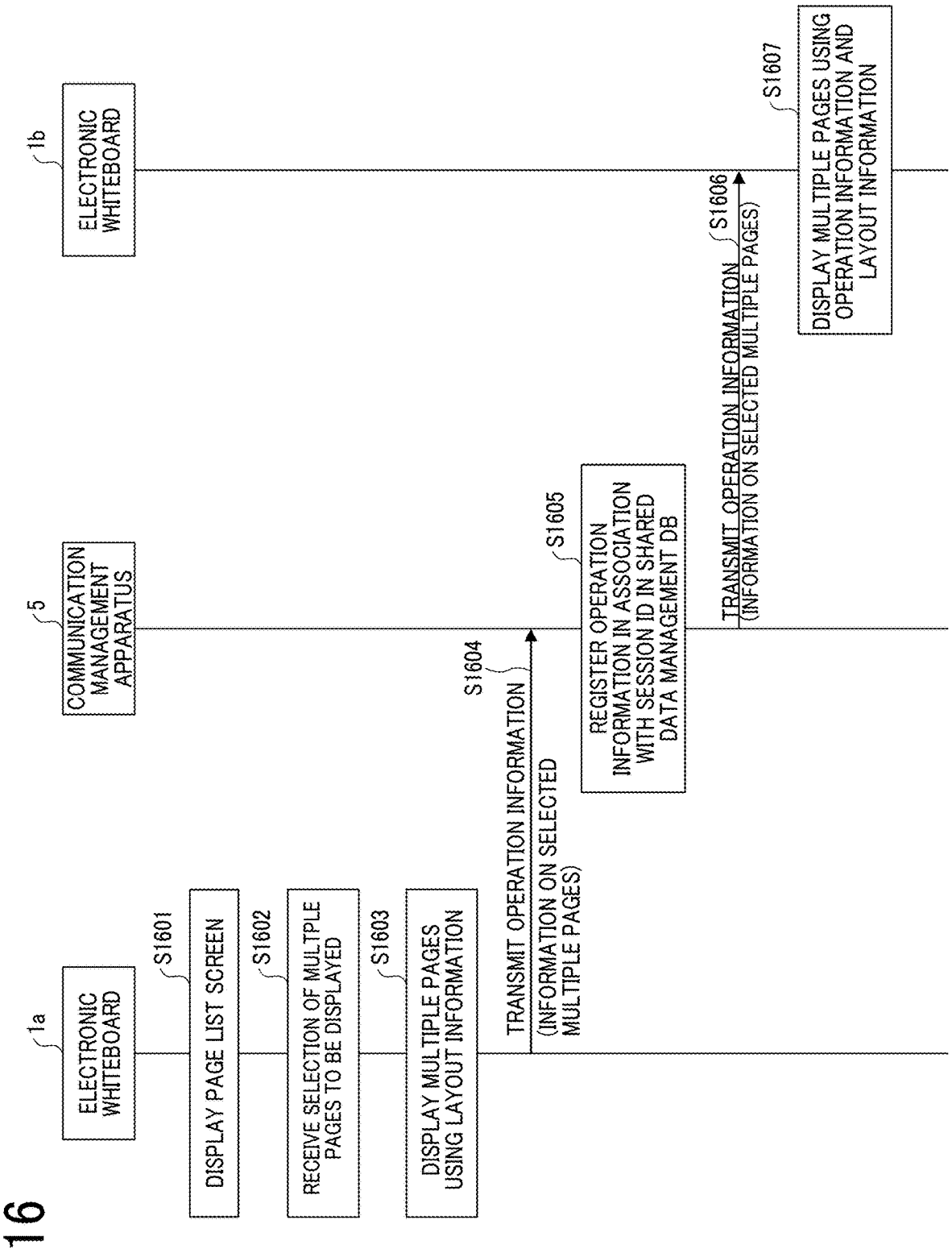
FIG. 16 is a sequence diagram illustrating an example of an operation of sharing multiple screens, according to the first embodiment of the present disclosure.

FIG. 16 is a sequence diagram illustrating an example of an operation of sharing multiple screens, according to the first embodiment. It is assumed that at the start point of the operation illustrated in FIG. 16, the electronic whiteboard 1a and the electronic whiteboard 1b are participating in the same conference (session) and data or information of multiple screens (pages) are already stored in the shared data management table 1100 as illustrated in FIG. 11.

Further, it is assumed that, for example, when the electronic whiteboard 1a and the electronic whiteboard 1b are participating in a conference identified by a session ID "se01", multiple screen information 1101 corresponding to the session ID "se01" among the shared data management table 1100 is stored in the storage unit 1000 as the operation information 1001.

Figure 17:
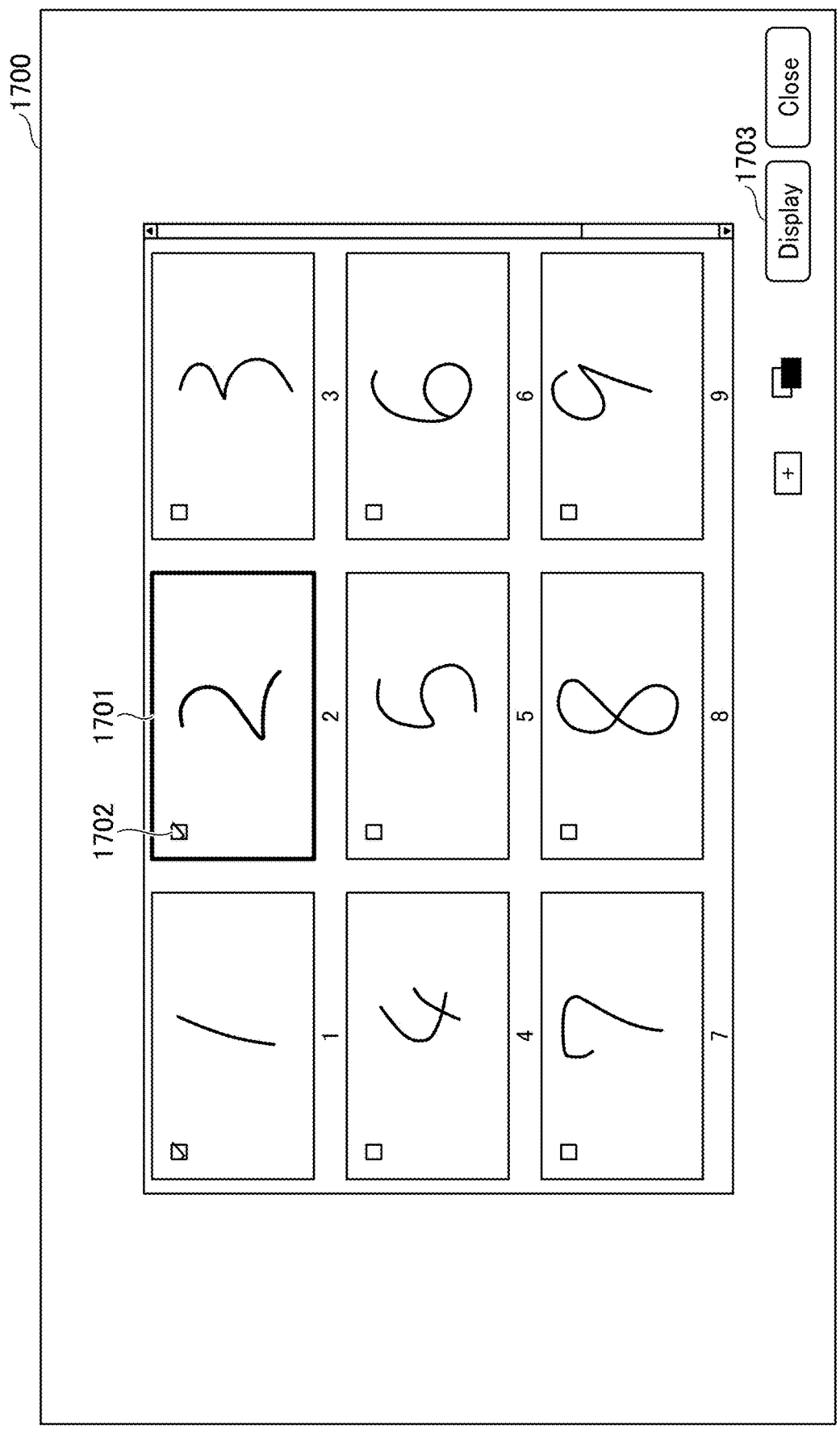
FIG. 17 is an illustration of an example of a page list screen, according to the first embodiment of the present disclosure.

In step S1601, the electronic whiteboard 1a displays the page list screen 1700 as illustrated in FIG. 17 on a display unit such as the display 180 in response to an operation by User A1 for displaying a page list screen, for example.

FIG. 17 is an illustration of an example of the page list screen 1700, according to the first embodiment. On the page list screen 1700, multiple pages (screens) 1701 available to be displayed on the electronic whiteboard 1a of the electronic whiteboard are displayed as being selectable. The page list screen 1700 is displayed on a display unit such as the display 180 by the operation screen display unit 17 of the electronic whiteboard 1a referring to the operation information 1001 stored in the storage unit 1000. The operation information 1001 stored in the storage unit 1000 includes the multiple screen information 1101 corresponding to the session ID "se01" identifying a conference in which the electronic whiteboard 1a participates, as illustrated in FIG. 11.

Referring again to FIG. 16, the operation in the sequence diagram is described.

In step S1602, the reception unit 12 of the electronic whiteboard 1a receives an operation by User A1 for selecting multiple pages to be displayed. For example, User A1 selects multiple screens to be displayed by selecting check boxes 1702 each being provided in each page 1701 of the page list screen 1700 and selecting a "display" button 1703.

In step S1603, the display control unit 14 of the electronic whiteboard 1a displays selected screens on a display unit such as the display 180 using the operation information 1001 and the layout information 1002 stored in the storage unit 1000.

In the layout information 1002 stored in the storage unit 1000 of the electronic whiteboard 1a and the electronic whiteboard 1b, layout information corresponding to the number of screens as illustrated in FIG. 18A to FIG. 18C is stored in advance.

FIG. 18A to FIG. 18C are conceptual diagrams each illustrating an example of the layout information, according to the first embodiment. FIG. 18A illustrates an example of the layout information when the number of multiple screens to be displayed is two. Specifically, FIG. 18A illustrates an example of layout information in which a first selected screen (e.g., "page 1") is arranged in the left half area and a second selected screen (e.g., "page 2") is arranged is the right half area. In substantially the same manner, FIG. 18B illustrates an example of the layout information when the number of multiple screens to be displayed is three. Further, FIG. 18C illustrates an example of the layout information when the number of multiple screens to be displayed is four.

It should be noted that the layout information illustrated in FIG. 18A to 18C is merely an example. Each layout information stores any other position, size, or the like than those illustrated in FIG. 18A to FIG. 18C. In another example, the layout information 1002 stored in the storage unit 1000 includes layout information corresponding to a case in which the number of screens to be displayed is five or more.

For example, when page 1 and page 2 are selected from the page list screen 1700 as illustrated in FIG. 17, the display control unit 14 of the electronic whiteboard 1a acquires the layout information as illustrated in FIG. 18A, which corresponding to the number "2" as multiple screens to be displayed. Further, the display control unit 14 of the electronic whiteboard 1a acquires information for displaying the page 1 and page 2 from the operation information 1001 stored in the storage unit 1000, to control a display unit such as the display 180 to display the page 1 and page 2 in a layout as illustrated in FIG. 18A.

In step S1604, the information transmission unit 16 of the electronic whiteboard 1a transmits the operation information including the information on the selected multiple pages to the electronic whiteboard 1b via the communication management apparatus 5. Thus, the communication unit 51 of the communication management apparatus 5 receives the operation information transmitted from the electronic whiteboard 1a.

This operation information includes information indicating multiple screens currently being displayed by the electronic whiteboard 1a (e.g., "current page: pag01, pag02"). Further, a sequence number is assigned to this operation information, and this operation information is stored in the operation information 1001 stored in the storage unit 1000 of the electronic whiteboard 1a with the assigned sequence number.

In step S1605, the shared data management unit 56 of the communication management apparatus 5 registers the operation information received from the electronic whiteboard 1a in, for example, the shared data management table 1100 as illustrated in FIG. 11.

In step S1606, the communication unit 11 of the communication management apparatus 5 transfers the operation information received from the electronic whiteboard 1a to the electronic whiteboard 1b participating in the same session as the electronic whiteboard 1a, in parallel with the process of step S1605. Thus, the communication unit 11 of the electronic whiteboard 1b receives the operation information transmitted by the electronic whiteboard 1a via the communication management apparatus 5. The received operation information is also stored in the operation information 1001 stored in the storage unit 1000 of the electronic whiteboard 1b.

In step S1607, the display control unit 14 of the electronic whiteboard 1b controls a display unit such as the display 180 of the electronic whiteboard 1b to display multiple screens using information on the multiple screens included in the received operation information and the layout information corresponding to the number of the multiple screens.

For example, the display control unit 14 of the electronic whiteboard 1b acquires layout information indicating a layout as illustrated in FIG. 18A, which corresponds to the number (e.g., two) of the multiple screens to be displayed, from the layout information 1002 stored in the storage unit 1000 of the electronic whiteboard 1b. Further, the display control unit 14 of the electronic whiteboard 1b acquires information for displaying the page 1 and page 2 selected at the electronic whiteboard 1b from the operation information 1001 stored in the storage unit 1000 of the electronic whiteboard 1b based on the information on the multiple screens included in the received operation information. Furthermore, the display control unit 14 of the electronic whiteboard 1b controls a display unit such as the display 180 of the electronic whiteboard 1b to display the page 1 and page 2 in the layout as illustrated in FIG. 18A, for example.

As a result of the operation as described above, the multiple screens (the page 1 and page 2) are displayed in the same layout on the display 180 of the electronic whiteboard 1a and the display 180 of the electronic whiteboard 1b, as illustrated in FIG. 19, for example. It should be noted that even when multiple screens are being shared as described above, a stroke image drawn on the page 1 being displayed by the electronic whiteboard 1a is displayed on the page 1 being displayed by the electronic whiteboard 1b.

Figure 20:
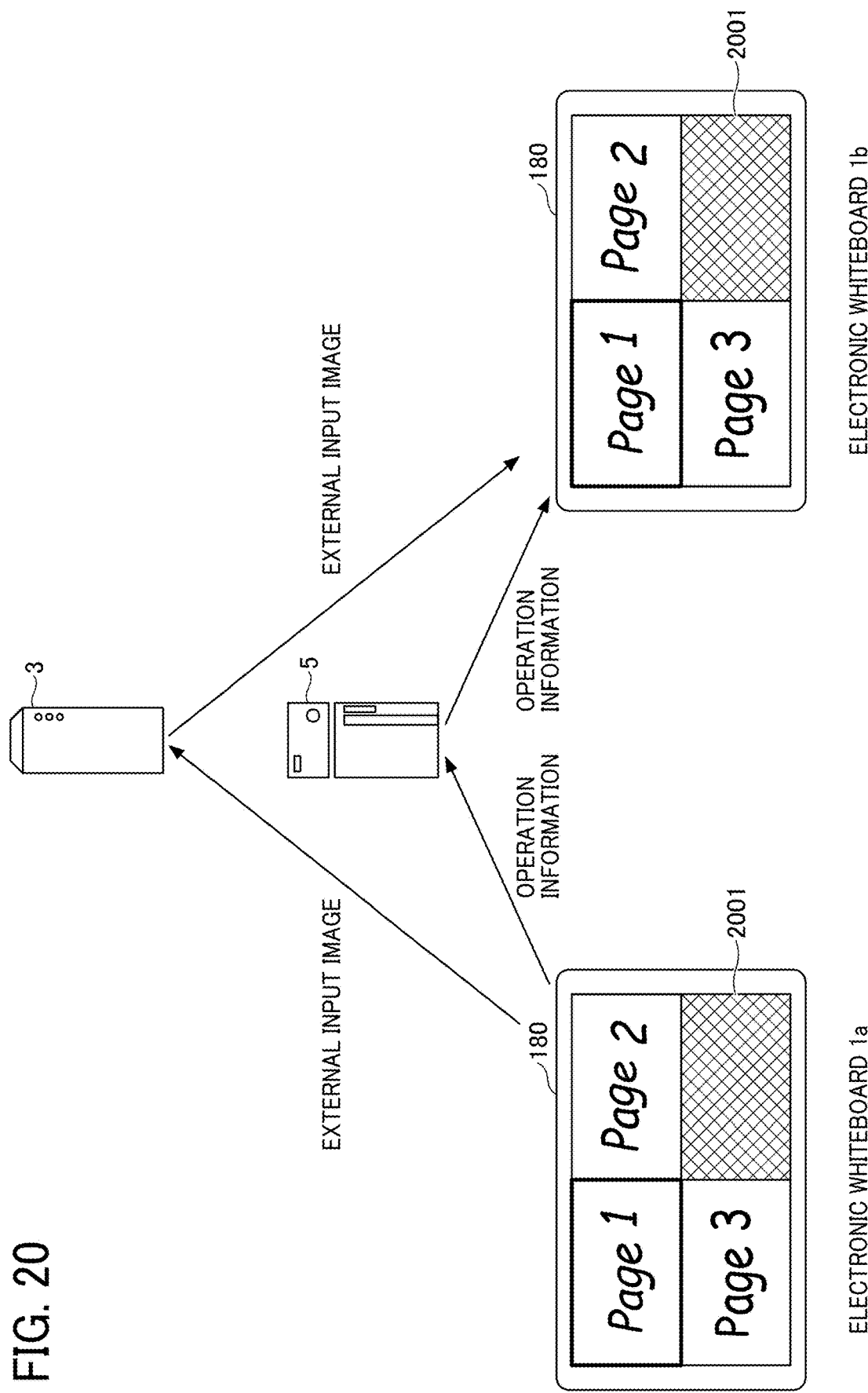
FIG. 20 is a diagram illustrating another example of a display screen displayed by the electronic whiteboard, according to the first embodiment of the present disclosure.

In another example, multiple screens shared by the electronic whiteboard 1a with another electronic whiteboard such as the electronic whiteboard 1b include an external input screen 2001, which is input from an external device (e.g., the PC 170) connected to, for example, the external device connection I/F 106 of the electronic whiteboard 1, as illustrated in FIG. 20.

For example, the electronic whiteboard 1a shares the external input screen 2001 with the electronic whiteboard 1b by transmitting the external input screen 2001 input from the PC 170 to the electronic whiteboard 1b via the relay apparatus 3. In another example, the electronic whiteboard 1a shares multiple screens including the external input screen 2001 with the electronic whiteboard 1b, as illustrated in FIG. 20, by selecting the external input screen 2001 on the page list screen 1700 illustrated in FIG. 17.

As described above, according to the first embodiment, in the communication system 100 in which a plurality of communication terminals including the electronic whiteboard 1a and the electronic whiteboard 1b share a screen with each other, multiple screens being selected and displayed by a given communication terminal (electronic whiteboard 1a) are shared with another communication terminal (electronic whiteboard 1b).

Note that in the present embodiment and the following embodiments, "information on multiple screens" is information on multiple screens displayed by the communication terminal according to an operation by an operator. This information includes, for example, information of selecting multiple screens or pages to be concurrently displayed on one screen of the communication terminal, or multiple screens or pages to be shared with another communication terminal participating in a conference, the multiple pages or screens being selected according to an operation by a user on a screen at the communication terminal.

Further, the "layout information corresponding to the number of multiple screens" is information on a layout of screens displayed at the communication terminal according to an operation by a user. This information includes, for example, one or more item of information on sizes, positions, and a layout of screens to be displayed at the communication terminal, or one or more item of information of a size, a position, and a layout of a screen to be shared with another communication terminal participating in a conference.

With such configuration, multiple screens are displayed in the same way at the electronic whiteboard 1a and the electronic whiteboard 1b. Accordingly, User B1 and User B2 using the electronic whiteboard 1b easily recognizes one or more pages about which User A1 using the electronic whiteboard 1a is explaining.

The operation of sharing multiple screens described above with reference to FIG. 16 is merely an example, and various modifications and applications can be made. The description given above is of an example in which the information transmission unit 16 of the electronic whiteboard 1a transmits the operation information including the information on multiple screens of which selection is received by the reception unit 12 to the electronic whiteboard 1b via the communication management apparatus 5. In another example, the destination to which the information transmission unit 16 of the electronic whiteboard 1 transmits the operation information is the communication management apparatus 5. In this case, the shared data management unit 56 of the communication management apparatus 5 has a function of transmitting the operation information to the electronic whiteboard 1b in addition to a function of storing the operation information received from the electronic whiteboard 1a in the shared data management DB 5006. In this case, the shared data management unit 56 of the communication management apparatus 5 has a function of an "information transmission unit" that transmits the operation information including the information on multiple screens of which selection is received by the reception unit 12 of the electronic whiteboard 1a to the electronic whiteboard 1b.

Second Embodiment

As described above, the electronic whiteboard 1a has a function of performing a videoconference with the electronic whiteboard 1b by transmitting and receiving a site image data and audio data for the videoconference. A screen displayed in the videoconference differs for each electronic whiteboard 1. For example, on a screen of the videoconference displayed by the electronic whiteboard 1a, an image (e.g., video image) of User B1 and User B2 captured by the camera 160 of the electronic whiteboard 1b is mainly displayed.

Figure 21:
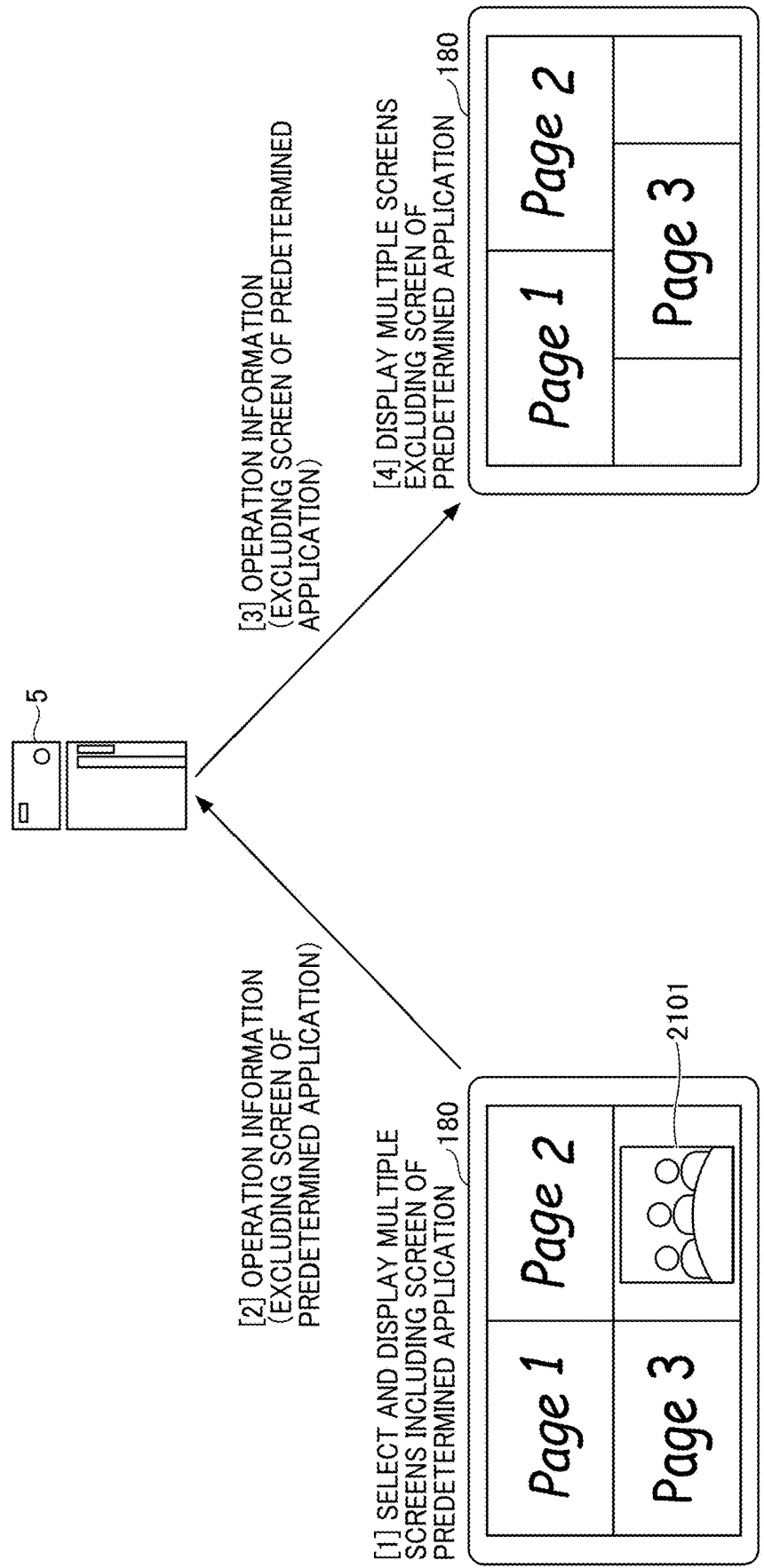
FIG. 21 is a diagram (1) illustrating an example of an operation of sharing multiple screens, according to the second embodiment of the present disclosure.

User A1 of the electronic whiteboard 1a can select multiple screens including a screen 2101 of such videoconference displaying the video image of User B1 and User B2 as described above from the page list screen 1700 as illustrated in FIG. 17. The selected multiple screens including the screen 2101 of the videoconference are displayed on the display 180 of the electronic whiteboard 1a, as illustrated in FIG. 21.

However, in many cases, the screen 2101 of the videoconference of the electronic whiteboard 1a is not required to be displayed at the electronic whiteboard 1b. This is because the electronic whiteboard 1b mainly displays an image (video image) of User A1 captured by the camera 160 of the electronic whiteboard 1a as the videoconference screen.

To address such issue, the electronic whiteboard 1 according to the second embodiment has a function of excluding a screen of a predetermined application such as a videoconference application from multiple screens shared with another electronic whiteboard 1. The predetermined application is set in advance, for example, by a user or a designer of the electronic whiteboard 1 as an example of a communication terminal.

Operation of Sharing Multiple Screens (1):

FIG. 21 is a diagram (1) illustrating an example of an operation of sharing multiple screens, according to the second embodiment. Since the operation of the second embodiment is performed in substantially the same manner as the first embodiment, in the following, differences from the first embodiment are mainly described.

In [1] of FIG. 21, the display control unit 14 of the electronic whiteboard 1a controls the display 180 to display multiple screens selected on the page list screen 1700 as illustrated in FIG. 17, for example.

When the screen 2101 of the predetermined application is included in the multiple screens displayed on the display 180 by the display control unit 14 of the electronic whiteboard 1a, the display control unit 14 prepares a dummy page and assigns a special PageType attribute such as "ExApp" to the dummy page. The dummy page is not permitted to have a child element such as a stroke and is deleted when display of multiple screens in respective divided areas is completed. When displaying the selected multiple screens, the display control unit 14 of the electronic whiteboard 1a allocates an area in which the dummy screen is to be displayed and displays a screen (window) of the predetermined application in the allocated area.

In [2] of FIG. 21, when the screen 2101 of the predetermined application is included in the multiple screens displayed by the electronic whiteboard 1a, the information transmission unit 16 of the electronic whiteboard 1a excludes the screen 2101 of the predetermined application from the operation information and transmits the operation information from which the screen 2101 of the predetermined application is excluded, to another electronic whiteboard such as the electronic whiteboard 1b via the communication management apparatus 5.

For example, when the multiple screens displayed by the electronic whiteboard 1a include a screen having the PageType attribute "ExApp" (e.g., "current page: pag01, pag02, pag03, ExApp), the information transmission unit 16 of the electronic whiteboard 1a excludes the screen having the PageType attribute "ExApp" from the operation information to be transmitted.

In [3] of FIG. 21, the communication unit 51 of the communication management apparatus 5 transfers the operation information (e.g., "current page: pag01, pag02, pag03) from which the screen 2101 of the predetermined application is excluded and received from the electronic whiteboard 1a to another electronic whiteboard such as the electronic whiteboard 1b participating in the same conference as the electronic whiteboard 1a. The description given above is of an example in which the electronic whiteboard 1a transmits the operation information after deleting the PageType attribute "ExApp" from the operation information. In another example, the communication management apparatus 5 transmits the operation information after deleting the PageType attribute "ExApp" from the operation information received from the electronic whiteboard 1a.

Thus, in [4] of FIG. 21, the display control unit 14 of the electronic whiteboard 1b displays, on the display 180 of the electronic whiteboard 1b, the multiple screens obtained by excluding the screen 2101 of the predetermined application from the multiple screens selected at the electronic whiteboard 1a.

Operation of Sharing Multiple Screens (2):

The screen of the predetermined application such as the videoconference application described above with reference to FIG. 21 is an example of a screen that is excluded in advance from targets to be shared. The screen that is excluded in advance from targets to be shared includes, for example, a memo screen 2201, which is temporarily displayed locally.

Figure 22:
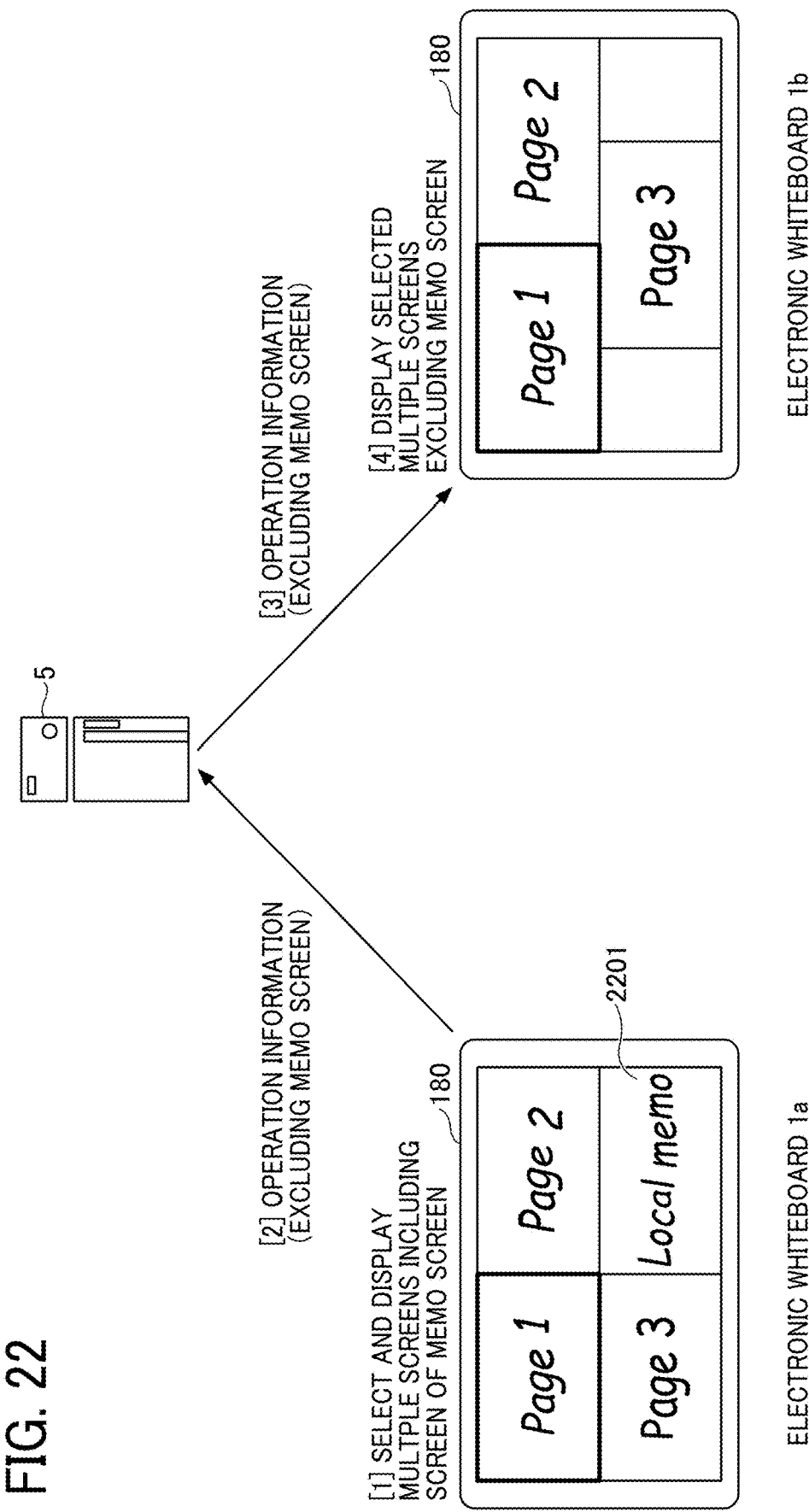
FIG. 22 is a diagram (2) illustrating an example of an operation of sharing multiple screens, according to the second embodiment of the present disclosure.

FIG. 22 is a diagram (2) illustrating an example of an operation of sharing multiple screens, according to the second embodiment. Since the operation of the second embodiment is performed in substantially the same manner as the first embodiment, in the following, differences from the first embodiment are mainly described.

In [1] of FIG. 22, the display control unit 14 of the electronic whiteboard 1a controls the display 180 to display multiple screens selected on the page list screen 1700 as illustrated in FIG. 17, for example.

When the memo screen 2201 is included in the multiple screens displayed on the display 180 by the display control unit 14 of the electronic whiteboard 1a, the display control unit 14 assigns a special PageType attribute such as "Memo" to the memo screen 2201.

In [2] of FIG. 22, when the memo screen 2201 is included in the multiple screens displayed by the electronic whiteboard 1a, the information transmission unit 16 of the electronic whiteboard 1a excludes the memo screen 2201 from the operation information and transmits the operation information from which the memo screen 2201 is excluded, to another electronic whiteboard such as the electronic whiteboard 1b via the communication management apparatus 5.

For example, when the multiple screens displayed by the electronic whiteboard 1a include a screen having the PageType attribute "Memo" (e.g., "current page: pag01, pag02, pag03, Memo), the information transmission unit 16 of the electronic whiteboard 1a excludes the screen having the PageType attribute "Memo" from the operation information to be transmitted.

In [3] of FIG. 22, the communication unit 51 of the communication management apparatus 5 transfers the operation information (e.g., "current page: pag01, pag02, pag03) from which the memo screen 2201 is excluded and received from the electronic whiteboard 1*a* to another electronic whiteboard such as the electronic whiteboard 1*b* participating in the same conference as the electronic whiteboard 1*a*. The description given above is of an example in which the electronic whiteboard 1*a* transmits the operation information after deleting the PageType attribute "Memo" from the operation information. In another example, the communication management apparatus 5 transmits the operation information after deleting the PageType attribute "Memo" from the operation information received from the electronic whiteboard 1*a*.

Thus, in [4] of FIG. 22, the display control unit 14 of the electronic whiteboard 1*b* displays, on a display unit such as the display 180 of the electronic whiteboard 1*b*, the multiple screens obtained by excluding the memo screen 2201 from the multiple screens selected at the electronic whiteboard 1*a*.

As described above, according to the second embodiment, when multiple screens displayed by the electronic whiteboard 1*a* include a screen that is excluded in advance from targets to be shared, the electronic whiteboard 1*a* and the electronic whiteboard 1*b* shares multiple screens from which the screen that is excluded in advance from targets to be shared is deleted.

Third Embodiment

Figure 23:
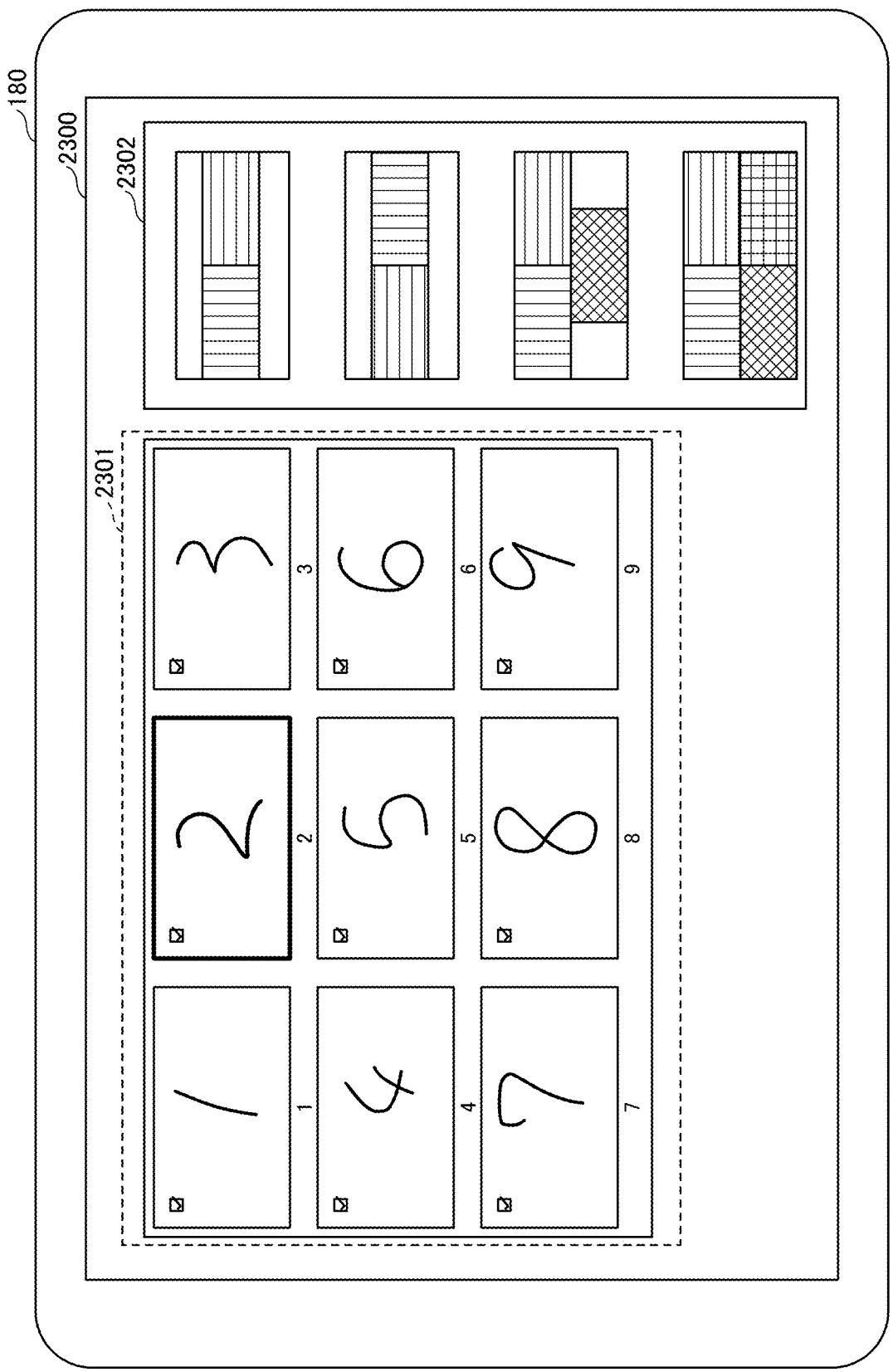
FIG. 23 is a diagram illustrating an example of a selection screen for selecting screens to be displayed, according to the third embodiment of the present disclosure.

FIG. 23 is a diagram illustrating an example of a selection screen 2300 that allows a user to select multiple screens to be displayed, according to the third embodiment. For example, the electronic whiteboard 1*a* displays the selection screen 2300 that allows a user to select multiple screens to be displayed as illustrated in FIG. 23, instead of the page list screen 1700 as illustrated in FIG. 17, to receive selection of multiple screens to be displayed by the electronic whiteboard 1*a*.

In the example of FIG. 23, the selection screen 2300 includes a list 2301 of selectable screens and a suggestion screen 2302 suggesting display patterns of multiple screens.

On the suggestion screen 2302, one or more display patterns determined by the operation screen display unit 17 of the electronic whiteboard 1*a* according to the following techniques A to F.

Technique A:

For example, the operation screen display unit 17 of the electronic whiteboard 1*a* displays, on the suggestion screen 2302, a display pattern in which a "currently displayed screen" and a "screen displayed immediately before". In one example, the screen displayed immediately before is identified from a display history of "current page" of the operation information 1001 stored in the storage unit 1000.

In another example, the operation screen display unit 17 displays, on the suggestion screen 2302, a display pattern in which the latest three screens or the latest four screens, are displayed.

Technique B:

For example, the operation screen display unit 17 of the electronic whiteboard 1*a* counts the number of times each screen is displayed, and displays, on the suggestion screen 2302, a display pattern in which a preset number of screens are displayed in descending order of the number of times of display. The preset number is set in advance, for example, by a user or a designer of the electronic whiteboard 1.

Technique C:

For example, the operation screen display unit 17 of the electronic whiteboard 1*a* totals time periods each screen is displayed, and displays, on the suggestion screen 2302, a display pattern in which a preset number of screens are displayed in descending order of the total time period of display. The preset number is set in advance, for example, by a user or a designer of the electronic whiteboard 1.

Technique D:

For example, the operation screen display unit 17 of the electronic whiteboard 1*a* displays, on the suggestion screen 2302, a display pattern in which a preset number of screens are displayed in descending order of writings to each screen (e.g., in descending order of the number of strokes of a stroke image). The preset number is set in advance, for example, by a user or a designer of the electronic whiteboard 1. In one example, as illustrated in FIG. 12, since each page (screen) is associated with stroke data, the display control unit 14 determines the descending order of writings to each screen based on the number of stroke data associated with each page.

Technique E:

In the operation information 1001 stored in the storage unit 1000, change information indicating a change such as addition of a background image to each screen (page) is also stored. For example, the operation screen display unit 17 of the electronic whiteboard 1*a* displays, on the suggestion screen 2302, a display pattern in which a preset number of screens are displayed in descending order of the time when such change is made indicated by the change information. The preset number is set in advance, for example, by a user or a designer of the electronic whiteboard 1.

Technique F:

For example, an external input image input from the PC 170 of User A1 often includes a document to be discussed mainly in a conference. In view of this, in one example, the operation screen display unit 17 of the electronic whiteboard 1*a* displays, on the suggestion screen 2302, a display pattern in which the external input image and one or more images selected by any one of the techniques A to E are displayed.

In another example, the operation screen display unit 17 of the electronic whiteboard 1*a* determines a display pattern to be displayed on the suggestion screen 2302 by combining two or more of the techniques A to F described above.

The selection screen 2300 as illustrated in FIG. 23 enables user A1 using the electronic whiteboard 1*a* to select multiple screens to be displayed on the electronic whiteboard 1*a* with simple operation. It should be noted that aspects of the third embodiment can be combined with the first embodiment and/or the second embodiment.

Operation:

FIG. 24A and FIG. 24B are flowcharts each illustrating an example of an operation performed by the electronic whiteboard 1, according the third embodiment. It is assumed that at the start point of the operations illustrated in FIG. 24A and FIG. 24B, the electronic whiteboard 1*a* and the electronic whiteboard 1*b* participate in the same conference (session).

Operation by Electronic Whiteboard 1*a*:

FIG. 24A illustrates an example of an operation performed by the electronic whiteboard 1*a*, according to the third embodiment.

In step S2401, in response to receiving an operation instructing displaying the selection screen 2300 as illustrated in FIG. 23, the electronic whiteboard 1*a* performs processes of step S2402 and subsequent steps.

In step S2402, the display control unit 14 of the electronic whiteboard 1*a* determines whether there is a screen of the predetermined application such as the videoconference application is present. For example, when the predetermined application is currently being executed, the display control unit 14 determines that the screen of the predetermined application is present.

When the screen of the predetermined application is present (step S2402: YES), the display control unit 14 of the electronic whiteboard 1a acquires a window (screen) of the predetermined application in step S2403. By contrast, when the screen of the predetermined application is not present (step S2402: NO), the operation by the display control unit 14 of the electronic whiteboard 1a proceeds to a process of step S2403 without performing the process of the step S2404.

In step S2404, the operation screen display unit 17 of the electronic whiteboard 1a creates one or more display patterns to be displayed on the suggestion screen 2302 of the selection screen 2300 as illustrated in FIG. 23. For example, the display control unit 14 of the electronic whiteboard 1a creates the one or more display patterns by the above-described techniques A to F or a combination of two or more thereof.

In step S2405, the operation screen display unit 17 of the electronic whiteboard 1a displays, on a display unit such as the display 180, the selection screen 2300 as illustrated in FIG. 23 including the suggestion screen 2302 displaying the one or more created display patterns to be selected. The reception unit 12 of the electronic whiteboard 1a receives a selection operation on the selection screen 2300 by User A1.

In step S2406, the display control unit 14 of the electronic whiteboard 1a controls a display unit such as the display 180 of the electronic whiteboard 1a to display a display screen displaying multiple screens selected by Users A1. For example, in response to selection one display pattern from the display patterns on the suggestion screen 2302 on the selection screen 2300 illustrated in FIG. 23, the display control unit 14 of the electronic whiteboard 1a displays multiple screens on the display 180 of the electronic whiteboard 1a in the selected display pattern.

In step S2407, the information transmission unit 16 of the electronic whiteboard 1a determines whether the multiple screens displayed by the display control unit 14 include a screen that is excluded in advance from targets to be shared. Based on the determination result that the screen that is excluded in advance from targets to be shared is not included (step S2407: NO), the operation by the information transmission unit 16 proceeds to a process of step S2408. By contrast, based on the determination result that the screen that is excluded in advance from targets to be shared is included (step S2407: YES), the operation by the information transmission unit 16 proceeds to a process of step S2409.

In step S2408, the information transmission unit 16 of the electronic whiteboard 1a creates operation information including information on the selected multiple screens and transmits the created operation information to the electronic whiteboard 1b via the communication management apparatus 5.

On the other hand, in step S2409, the information transmission unit 16 of the electronic whiteboard 1a creates operation information obtained by deleting the screen that is excluded in advance from targets to be shared from the selected multiple screens, and transmits the created operation information to the electronic whiteboard 1b via the communication management apparatus 5.

Operation by Electronic Whiteboard 1b:

FIG. 24B illustrates an example of an operation performed by the electronic whiteboard 1b, according to the third embodiment.

In step S2411, when the communication unit 11 of the electronic whiteboard 1b receives the operation information transmitted by the electronic whiteboard 1a, for example, via the communication management apparatus 5, processes of step S2412 and subsequent steps are performed.

In step S2412, the display control unit 14 of the electronic whiteboard 1b acquires layout information corresponding to the number of screens included in the operation information from the layout information 1002 stored in advance in the storage unit 1000 of the electronic whiteboard 1b. For example, when the operation information includes information on four screens, the display control unit 14 of the electronic whiteboard 1b acquires layout information of FIG. 18C, which corresponds to four screens, from among a plurality of pieces of layout information as illustrated in FIG. 18A to FIG. 18C.

In step S2413, the display control unit 14 of the electronic whiteboard 1b creates a display screen in which multiple screens are arranged according to the acquired layout information based on the information on the multiple screens included in the operation information, and displays the created display screen on a display unit such as the display 180 of the electronic whiteboard 1b.

In conventional conference systems, there is a demand for sharing multiple screens selected and displayed by a certain communication terminal with one or more other communication terminals.

However, in the conventional conference systems, since contents to be displayed on a shared screen are determined in accordance with the order of attention paid to conference data, multiple screens selected and displayed by a certain communication terminal are not shared with one or more other communication terminals.

According to one or more embodiments of the present disclosure, in a communication system including multiple communication terminals that share a screen with each other, multiple screens selected and displayed by a certain communication terminal are shared with other one or more communication terminals.

The above description given above is of an example in which the electronic whiteboard 1a transmits the operation information to the electronic whiteboard 1b via the communication management apparatus 5. In another example, the electronic whiteboard 1a transmits the operation information to the electronic whiteboard 1b without intervening the communication management apparatus 5.

In still another example, multiple screens to be shared between the electronic whiteboard 1a and the electronic whiteboard 1b is selected by the electronic whiteboard 1b. In this case, the electronic whiteboard 1b performs the operation of FIG. 24A, and the electronic whiteboard 1a performs the operation of FIG. 24B.

As described above, according to each of embodiments of the present disclosure, in the communication system 100 in which screens are shared among a plurality of communication terminals such as the electronic whiteboards 1, multiple screens selected and displayed by a given communication terminal such as the electronic whiteboard 1a are shared with another communication terminal such as the electronic whiteboard 1b.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The description given above is of the example embodiments in which the communication terminal is the electronic whiteboard 1. In another example, the communication terminal is an information terminal having a communication capability, such as a PC, a smartphone, or a tablet terminal that executes an application supporting the communication system 100. Examples of the communication terminal further include various electronic devices having a communication capability and a display function, such as a projector, a videoconference apparatus, a digital signage, a medical device, and a car navigation apparatus supporting the communication system 100.

Further, any one of the above-described program for the communication terminal may be recorded in a file in a format installable or executable on a computer-executable storage medium for distribution. In alternative to being stored on a storage medium, the program for the communication terminal may be downloaded from a cloud server or a on-premises sever and installed in the communication terminal.

In another example, the communication management apparatus 5 is implement by, instead of the computer 400 as illustrated in FIG. 4, an electronic device such as a mobile phone, a smartphone, a tablet terminal, a wearable terminal, a personal data assistant (PDA), or an image forming apparatus.

According to one or more embodiments, a non-transitory computer-executable storage medium storing a program causing a communication system including a first communication terminal and a second communication terminal to perform a method. The method includes receiving, by the first communication terminal, selection of multiple screens to be displayed on a first display of the first communication terminal. The method further includes controlling, by the second communication terminal, a second display of the second communication terminal to display the multiple screens for which the selection is received by the first circuitry, by using information on the multiple screens and layout information corresponding to a number of screens of the multiple screens.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A communication system, comprising:
a first communication terminal including first circuitry configured to receive selection of multiple screens to be displayed on a first display of the first communication terminal; and
a second communication terminal including second circuitry configured to control a second display of the second communication terminal to display the multiple screens for which the selection is received by the first circuitry, wherein
the second circuitry controls the second display to display the multiple screens using information on the multiple screens and layout information corresponding to a number of screens of the multiple screens, and
the multiple screens include at least a first stroke image drawn by one user using the first communication terminal and a second stroke image drawn by another user using the second communication terminal.

2. The communication system of claim 1, wherein the first circuitry of the first communication terminal is further configured to transmit the information on the multiple screens for which the selection is received to the second communication terminal.

3. The communication system of claim 1, wherein the multiple screens further include an external input screen that shares an external input image that is input to one of the first communication terminal and the second communication terminal.

4. The communication system of claim 2, wherein when the multiple screens for which the selection is received by the first circuitry include a screen that is excluded in advance from targets to be shared, the first circuitry transmits, to the second communication terminal, the information on the multiple screens from which the screen that is excluded in advance from targets to be shared is excluded.

5. The communication system of claim 1, wherein the first circuitry is further configured to control the first display to display a suggestion screen displaying selectable one or more combinations, each being a combination of two or more of the multiple screens to be displayed on the first display of the first communication terminal, based on a display history of screens displayed by the first communication terminal.

6. The communication system of claim 2, further comprising
a communication management apparatus that manages communication between the first communication terminal and the second communication terminal, wherein
the first circuitry of the first communication terminal transmits the information on the multiple screens for which the selection is received by the first circuitry to the second communication terminal via the communication management apparatus, and
the communication management apparatus includes third circuitry configured to
receive the information on the multiple screens transmitted from the first communication terminal,
transfer the information on the multiple screens to the second communication terminal, and
store, in a memory, the information on the multiple screens in association with identification information identifying the communication.

7. A communication terminal that communicates with another communication terminal, the communication terminal comprising:
circuitry configured to:
receive selection information from another communication terminal, the selection information indicating multiple screens for which selection is received by the another communication terminal and the multiple screens are to be displayed on a display of the communication terminal; and
control the display to display the multiple screens using the selection information and layout information corresponding to a number of screens of the multiple screens, wherein
the multiple screens include at least a first stroke image drawn by one user using the first communication terminal and a second stroke image drawn by another user using the second communication terminal.

8. A screen sharing method performed by a communication terminal that communicates with another communication terminal, the screen sharing method comprising:

receiving selection information from another communication terminal, the selection information indicating multiple screens for which selection is received by the another communication terminal and the multiple screens are to be displayed on a display of the communication terminal; and controlling the display to display the multiple screens using the selection information and layout information corresponding to a number of screens of the multiple screens, wherein the multiple screens include at least a first stroke image drawn by one user using the first communication terminal and a second stroke image drawn by another user using the second communication terminal.

* * * * *